(12) United States Patent
Kabisa et al.

(10) Patent No.: US 12,165,031 B2
(45) Date of Patent: Dec. 10, 2024

(54) STANDARD ERROR FOR DEEP LEARNING MODEL OUTCOME ESTIMATOR

(71) Applicant: SAS Institute Inc., Cary, NC (US)

(72) Inventors: Sylvie Tchumtchoua Kabisa, Morrisville, NC (US); Xilong Chen, Chapel Hill, NC (US); Gunce Eryuruk Walton, Raleigh, NC (US); David Bruce Elsheimer, Clayton, NC (US); Ming-Chun Chang, Cary, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 18/529,014

(22) Filed: Dec. 5, 2023

(65) Prior Publication Data

US 2024/0346284 A1 Oct. 17, 2024

Related U.S. Application Data

(60) Provisional application No. 63/460,015, filed on Apr. 17, 2023.

(51) Int. Cl.
  *G06N 3/04*   (2023.01)
  *G06N 3/045*  (2023.01)
  *G06N 3/08*   (2023.01)
  *G06N 3/084*  (2023.01)

(52) U.S. Cl.
  CPC ............ *G06N 3/04* (2013.01); *G06N 3/045* (2023.01); *G06N 3/08* (2013.01); *G06N 3/084* (2013.01)

(58) Field of Classification Search
  None
  See application file for complete search history.

(56) References Cited

U.S. PATENT DOCUMENTS

| | | | |
|---|---|---|---|
| 10,360,517 B2 | 7/2019 | Koch et al. | |
| 10,600,005 B2 | 3/2020 | Gunes et al. | |
| 10,832,174 B1 | 11/2020 | Chen et al. | |
| 11,093,833 B1 | 8/2021 | Gardner et al. | |

(Continued)

OTHER PUBLICATIONS

Zhu et al ("Causal Inference with Treatment Measurement Error: A Nonparametric Instrumental Variable Approach" 2022) (Year: 2022).*

(Continued)

*Primary Examiner* — Lut Wong
(74) *Attorney, Agent, or Firm* — Bell & Manning, LLC

(57) ABSTRACT

A treatment model trained to compute an estimated treatment variable value for each observation vector of a plurality of observation vectors is executed. Each observation vector includes covariate variable values, a treatment variable value, and an outcome variable value. An outcome model trained to compute an estimated outcome value for each observation vector using the treatment variable value for each observation vector is executed. A standard error value associated with the outcome model is computed using a first variance value computed using the treatment variable value of the plurality of observation vectors, using a second variance value computed using the treatment variable value and the estimated treatment variable value of the plurality of observation vectors, and using a third variance value computed using the estimated outcome value of the plurality of observation vectors. The standard error value is output.

30 Claims, 18 Drawing Sheets

(56) References Cited

U.S. PATENT DOCUMENTS

| | | |
|---|---|---|
| 11,354,566 B1 * | 6/2022 | Chen ...................... G06N 3/002 |
| 2023/0351249 A1 | 11/2023 | Livny |

OTHER PUBLICATIONS

Sheth et al ("CauseBox: A Causal Inference Toolbox for Benchmarking Treatment Effect Estimators with Machine Learning Methods" 2021) (Year: 2021).*

Zhao et al ("Machine Learning in Causal Inference: Application in Pharmacovigilance" 2022) (Year: 2022).*

Blundell, C., Cornebise, K. Kavukcuoglu, and Wierstra, D. (2015) Weight uncertainty in neural network, in Proceedings of the 32nd International Conference on Machine Learning, ser. Proceedings of Machine Learning Research, vol. 37, 2015, pp. 1613-1622.

Chernozhukov, Victor, Denis Chetverikov, Mert Demirer, Esther Duflo, Christian Hansen, Whitney Newey, James Robins, Double/debiased machine learning for treatment and structural parameters, The Econometrics Journal, vol. 21, Issue 1, Feb. 1, 2018, pp. C1-C68, https://doi.org/10.1111/ectj.12097.

Chesnaye NC, Stel VS, Tripepi G, Dekker FW, Fu EL, Zoccali C, Jager KJ. An introduction to inverse probability of treatment weighting in observational research. Clin Kidney J. Aug. 26, 2021;15(1):14-20. doi: 10.1093/ckj/sfab158. PMID: 35035932; PMCID: PMC8757413. https://www.ncbi.nlm.nih.gov/pmc/articles/PMC8757413/.

Colangelo, Kyle, and Lee, Ying-Ying (Jun. 2022) Double Debiased Machine Learning Nonparametric Inference with Continuous Treatments. arXiv:2004.03036v7.

Farrell, Max H. and Liang, Tengyuan and Misra, Sanjog (2020) Deep Learning for Individual Heterogeneity: An Automatic Inference Framework. arXiv.2010.14694.

Jospin, L. V. Laga, H, Boussaid, F., Buntine, W. and M. Bennamoun (May 2022), Hands-On Bayesian Neural Networks A Tutorial for Deep Learning Users, in IEEE Computational Intelligence Magazine, vol. 17, No. 2, pp. 29-48.

Gal, Y., & Smith, L. 2018, Sufficient Conditions for Idealised Models to Have No. Adversarial Examples: a Theoretical and Empirical Study with Bayesian Neural Networks. arXiv:1806.00667.

Lakshminarayanan, B., Pritzel, A., & Blundell, C. 2017, "Simple and Scalable Predictive Uncertainty Estimation using Deep Ensembles." Advances in Neural Information Processing Systems 30, ed. I. Guyon, U. V. Luxburg, S. Bengio et al. (Red Hook, NY: Curran Associates), 6402.

Li, F., Ding, P. and Mealli, F. (Oct. 2022), "Bayesian Causal Inference: A Critical Review," ArXiv e-prints URL: https://doi.org/10.48550/arXiv.2206.15460.

SAS Documentation. "SAS Econometrics Procedures". Chapter 14. The DEEPCAUSAL Procedure. Aug. 17, 2023, SAS Institute Inc, Cary, NC. 851-896.

SAS Documentation. "SAS Econometrics Procedures". Chapter 15. The DEEPPRICE Procedure. Aug. 17, 2023, SAS Institute Inc, Cary, NC. 897-954.

SAS/STAT 14.2 User's Guide. The CAUSALTRT Procedure. Chapter 33. The CAUSALTRT Procedure. 2016, SAS Institute Inc, Cary, NC. 2053-2110.

Cui, Tianyu, Pekka Marttinen, and Samuel Kaski. "Learning global pairwise interactions with Bayesian neural networks." arXiv preprint arXiv:1901.08361 (2019).

Legler, Stefanie, and Tijana Janjic. "Combining data assimilation and machine learning to estimate parameters of a convective-scale model." arXiv preprint arXiv:2109.02953 (2021).

Zheng, Hao, Degang Wang, and Wei Zhou. "A modified Bayesian neural network integrating stochastic configuration network and ensemble learning strategy." 2021 8th International Conference on Information, Cybernetics, and Computational Social Systems (ICCSS). IEEE, 2021.

Farrell, Max H., Tengyuan Liang, and Sanjog Misra. Deep Learning for Individual Heterogeneity: An Automatic Inference Framework. No. 2010.14694. 2021.

Beker, W., Wolos, A., Szymkuc, S., and Grzybowski, B. A. (2020). "Minimal-uncertainty prediction of general drug-likeness based on Bayesian neural networks," Nature Machine Intelligence, vol. 2, No. 8, pp. 457-465.

Chronopoulos, I., Chrysikou, K., Kapetanios, G., Mitchell, J., and Raftapostolos, A. (2023). "Deep Neural Network Estimation in Panel Data Models." Working Paper No. 23-15. Federal Reserve Bank of Cleveland. https://doi.org/10.26509/frbc-wp-202315.

Kapetanios, G., Kempf, F. and Massacci, D. (2023). "Interpretable Machine Learning for Asset Pricing". Available at SSRN: https://ssrn.com/abstract=4473746 or http://dx.doi.org/10.2139/ssm.4473746.

Zhang, X. and. Mahadevan, S. (2020). "Bayesian neural networks for flight trajectory prediction and safety assessment," Decision Support Systems, vol. 131, p. 113246.

D. Wang, M. Li, Stochastic configuration networks: Fundamentals and algorithms, IEEE Transactions on Cybernetics, 47(10)(2017) 3466-3479.

\* cited by examiner

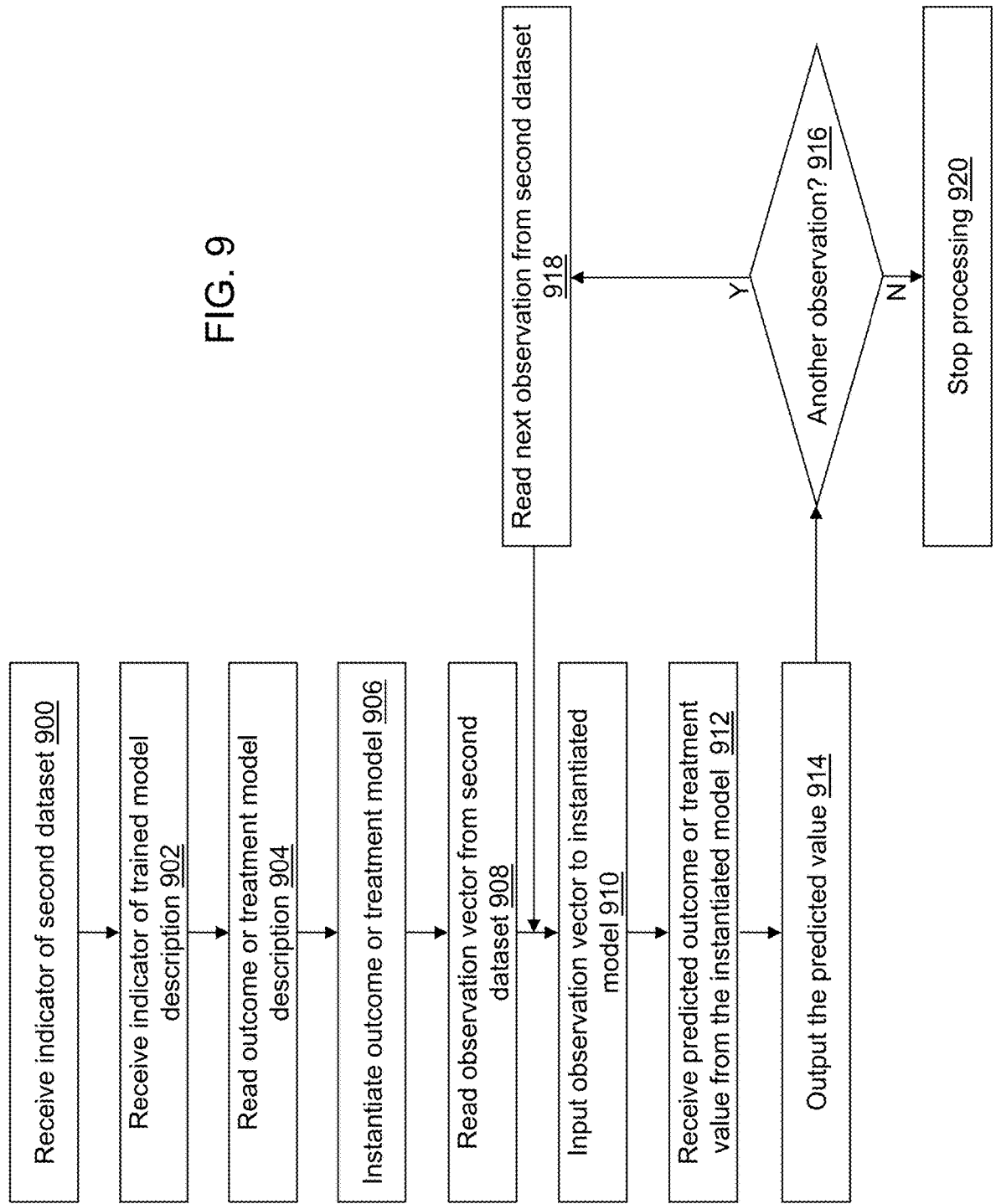

STANDARD ERROR FOR DEEP LEARNING MODEL OUTCOME ESTIMATOR

CROSS-REFERENCE TO RELATED APPLICATIONS

The present application claims the benefit of and priority under 35 U.S.C. § 119(e) to U.S. Provisional Patent Application No. 63/460,015 filed Apr. 17, 2023, the entire contents of which are hereby incorporated by reference.

BACKGROUND

Causal inference is an important and active field in both academia and industry. Causal inference identifies causes, measures their effects, and directs policy making. Since randomized controlled trials are often expensive or even impossible, the causal effect may be estimated from observational data. There are several technical difficulties to do so, especially in the big-data world. For example, there may be a large number of potential covariates; there may be unknown nonlinear relationships between those covariates and an outcome variable and a treatment variable, and the variables may be discrete, continuous, or mixed.

Here, the outcome variables are a result of interest, and the treatment variables are a possible cause that describes the action, the intervention, or the treatment assignment. The other variables describe characteristics of the object of interest (such as a patient, customer, store, etc.) or the situation and context. The outcome variables or treatment variables may be a vector of variables, although in most real-world cases, they are scalars. The causal effect, also known as the treatment effect, is the effect of the treatment variables on the outcome variables.

For example, in the process of studying the effect of a new medicine on a patient, the outcome is the final health status of the patient, and the treatment is whether to assign the medicine to the patient and what dosage to assign. For any individual, the outcome is only observed for the treatment value chosen, but not the outcome at any other treatment value. What if a different treatment value was provided to the individual? Would the outcome be better? Such a what-if outcome can never be directly observed. For observational data, the covariates might affect both outcome and treatment, introducing a selection bias. To correct the selection bias, both the treatment model (the relationship between the treatment and the covariates) and the outcome model (the relationship between the outcome and the treatment and covariates) are modeled, and various methods are used to define a debiased estimator. What is missing is a confidence interval of the estimator to indicate a confidence in the chosen treatment and associated outcome.

SUMMARY

In an example embodiment, a computer-readable medium is provided having stored thereon computer-readable instructions that when executed by a computing device, cause the computing device to compute a standard error of an estimator determined by training a machine learning model. A treatment model trained to compute an estimated treatment variable value for each observation vector of a plurality of observation vectors is executed. Each observation vector includes covariate variable values for a plurality of covariate variables, a treatment variable value for a treatment variable, and an outcome variable value for an outcome variable. An outcome model trained to compute an estimated outcome value for each observation vector of the plurality of observation vectors using the treatment variable value for each observation vector of the plurality of observation vectors is executed. A standard error value associated with the outcome model is computed using a first variance value computed using the treatment variable value of the plurality of observation vectors, using a second variance value computed using the treatment variable value and the estimated treatment variable value of the plurality of observation vectors, and using a third variance value computed using the estimated outcome value of the plurality of observation vectors. The computed standard error value is output.

In another example embodiment, a computing device is provided. The computing device includes, but is not limited to, a processor and a computer-readable medium operably coupled to the processor. The computer-readable medium has instructions stored thereon that, when executed by the processor, cause the computing device to compute a standard error of an estimator determined by training a machine learning model.

In yet another example embodiment, a method of computing a standard error of an estimator determined by training a machine learning model is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

FIG. 3AB provides a true dose-response curve for a first dataset in accordance with an illustrative embodiment.

FIG. 3B provides an estimated response for the first dataset using an existing method to compute the standard error in accordance with an illustrative embodiment.

FIG. 4AB provides a true dose-response curve for the second dataset in accordance with an illustrative embodiment.

FIG. 4B provides an estimated response for the second dataset using an existing method to compute the standard error in accordance with an illustrative embodiment.

FIG. 7AB provides a true dose-response curve for the fifth dataset in accordance with an illustrative embodiment.

FIG. 7B provides an estimated response for the fifth dataset using an existing method to compute the standard error in accordance with an illustrative embodiment.

FIG. 9 depicts a flow diagram illustrating examples of operations performed by a prediction application of the prediction device of FIG. 8 in accordance with an illustrative embodiment.

DETAILED DESCRIPTION

Figure 1:
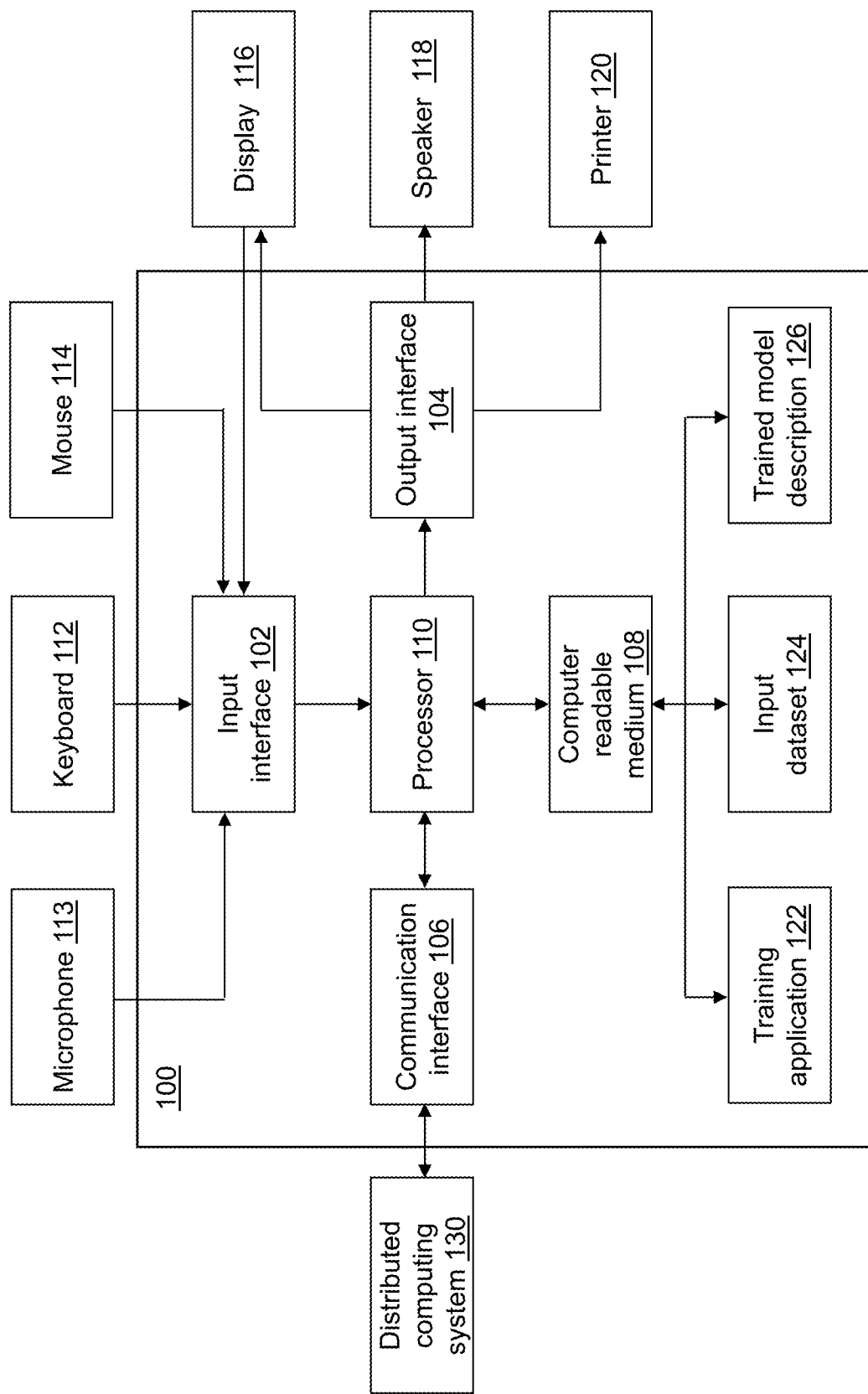
FIG. 1 depicts a block diagram of a model training device in accordance with an illustrative embodiment.

Causal effects may be estimated through the observational data, for example, captured in an input dataset 124 (shown referring to FIG. 1). Causal inference identifies the causes, measures their effects, and directs policy making. There are mainly three kinds of variables: an outcome variable Y, a treatment variable(s) T, and covariate variables X. For any individual i (at the implicit exact moment), only the outcome y; at the exact treatment value $t_i$ can be observed, but not the outcome at any other treatment value. For observational data, the covariates $x_i$ may affect both the outcome and the treatment resulting in a selection bias. To correct the selection bias, both the treatment model (the relationship between the treatment variable and the covariate variables) and the outcome model (the relationship between the outcome variable and both the treatment variable and covariate variables) are estimated. Without loss of generality, assuming both outcome and treatment are continuous, the treatment model may be expressed as a regression $E(T|X=x)=g(x)$. The outcome model may be expressed as a regression $E(Y|T=t, X=x)=f(x, t)$. If the outcome value or the treatment value is discrete, $E(\cdot|\cdot)$ can be replaced with $Pr(\cdot|\cdot)$.

In a paper by M. H. Farrell, et al. titled *Deep Learning for Individual Heterogeneity: An Automatic Inference Framework* and published in 2021 (Farrell) and in U.S. Pat. No. 11,354,566 that issued Jun. 7, 2022, a semi-parametric framework based on Deep Neural Networks is used. The debiasing process includes Influence Functions, which require that the outcome model be in the form: $G(\alpha(x)+\beta(x)t)$, where $G(\cdot)$ is any known function, and $\alpha(\cdot)$ and $\beta(\cdot)$ can be in any unknown form. This semi-parametric framework handles high dimensional covariates and a mixture of continuous and discrete variables well. If the treatment is binary, the unknown function forms $g(\cdot)$ and $f(\cdot)$ may be highly nonlinear, but the semi-parametric framework handles this since for any function form $f(x,t)$, $f(x, t)$ can be expressed as $G(\alpha(x)+\beta(x)t)$. However, when the treatment is multi-valued, or continuous, or count, the semi-parametric framework based on Deep Neural Networks cannot handle highly nonlinear function forms $g(\cdot)$ and $f(\cdot)$, which means there is a risk of misspecification. The restrictive form $G(\alpha(x)+\beta(x)t)$ cannot express the true unknown form $f(x, t)$. For continuous treatment variables, a paper by Kyle Colangelo and Ying-Ying Lee titled *Double Debiased Machine Learning Nonparametric Inference with Continuous Treatments* and published in 2022 (the Colangelo paper) proposed a non-parametric framework to deal with this challenge, but a 95% confidence interval of the estimator only covers about 23% of the true values meaning the confidence interval is not trustworthy. A training application 122 (shown referring to FIG. 1), as described further below provides a confidence interval that is trustworthy.

As discussed previously, when the treatment variable is binary, the semi-parametric framework can be directly used as a "nonparametric" framework, since no assumption of model specification is needed. When the treatment variable is multi-valued, the treatment variable can be levelized. The treatment variable can take K different values assumed as $t=0, \ldots, K-1$. A vector (K−1) by 1 vector $\vec{t}$ can be constructed such that $\vec{t}=0_{K-1}$ corresponds to $t=0$, and $\vec{t}=e_i$ corresponds to $t=i$, $i=1, \ldots, K-1$, where $0_{K-1}$ is a (K−1) by 1 vector of zeros, and $e_i$ is a (K−1) by 1 unit vector with the ith element as one and the remaining elements as zero. Then, $G(\alpha(x)+\beta(x)'\vec{t})$ can express any form of outcome model $f(x, t)$, so that the semi-parametric framework can be used as a "nonparametric" framework without any model-specification assumption. For debiasing when the treatment variable is continuous or count, an inverse probability of treatment weighting (IPTW) as described in a paper by Nicholas C. Chesnaye, et al. titled *An Introduction to Inverse Probability of Treatment Weighting in Observational Research* and published in 2021 may be applied.

Referring to FIG. 1, a block diagram of a model training device 100 is shown in accordance with an illustrative embodiment. Model training device 100 may include an input interface 102, an output interface 104, a communication interface 106, a non-transitory computer-readable medium 108, a processor 110, training application 122, input dataset 124, and a trained model description 126. Fewer, different, and/or additional components may be incorporated into model training device 100.

Input interface 102 provides an interface for receiving information from the user or another device for entry into model training device 100 as understood by those skilled in the art. Input interface 102 may interface with various input technologies including, but not limited to, a keyboard 112, a microphone 113, a mouse 114, a display 116, a track ball, a keypad, one or more buttons, etc. to allow the user to enter information into model training device 100 or to make selections presented in a user interface displayed on display 116.

The same interface may support both input interface 102 and output interface 104. For example, display 116 comprising a touch screen provides a mechanism for user input and for presentation of output to the user. Model training device 100 may have one or more input interfaces that use the same or a different input interface technology. The input interface technology further may be accessible by model training device 100 through communication interface 106.

Output interface 104 provides an interface for outputting information for review by a user of model training device 100 and/or for use by another application or device. For example, output interface 104 may interface with various output technologies including, but not limited to, display 116, a speaker 118, a printer 120, etc. Model training device 100 may have one or more output interfaces that use the same or a different output interface technology. The output interface technology further may be accessible by model training device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Model training device 100 may have one or more communication interfaces that use the same or a different communication interface technology. For example, model training device 100 may support communication using an Ethernet port, a Bluetooth antenna, a telephone jack, a USB port, etc. Data and/or messages may be transferred between model training device 100 and another computing device of a distributed computing system 130 using communication interface 106.

Computer-readable medium 108 is a non-transitory electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Model training device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Model training device 100 also may have one or more drives that support the loading of a memory media such as a CD, DVD, an external hard drive, etc. One or more external hard drives further may be connected to model training device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming languages, scripting languages, assembly languages, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Model training device 100 may include a plurality of processors that use the same or a different processing technology.

Some machine-learning approaches may be more efficiently and speedily executed and processed with machine-learning specific processors (e.g., not a generic central processing unit (CPU)). Such processors may also provide additional energy savings when compared to generic CPUs. For example, some of these processors can include a graphical processing unit, an application-specific integrated circuit, a field-programmable gate array, an artificial intelligence accelerator, a purpose-built chip architecture for machine learning, and/or some other machine-learning specific processor that implements a machine learning approach using semiconductor (e.g., silicon, gallium arsenide) devices. These processors may also be employed in heterogeneous computing architectures with a number of and a variety of different types of cores, engines, nodes, and/or layers to achieve additional various energy efficiencies, processing speed improvements, data communication speed improvements, and/or data efficiency targets and improvements throughout various parts of the system.

Training application 122 performs operations associated with defining trained model description 126 from data stored in input dataset 124. Trained model description 126 may be used to predict a treatment value for data stored in a second dataset 824 (shown referring to FIG. 8). Some or all of the operations described herein may be embodied in training application 122. The operations may be implemented using hardware, firmware, software, or any combination of these methods.

Referring to the example embodiment of FIG. 1, training application 122 is implemented in software (comprised of computer-readable and/or computer-executable instructions) stored in computer-readable medium 108 and accessible by processor 110 for execution of the instructions that embody the operations of training application 122. Training application 122 may be written using one or more programming languages, assembly languages, scripting languages, etc. Training application 122 may be integrated with other analytic tools. As an example, training application 122 may be part of an integrated data analytics software application and/or software architecture such as that offered by SAS Institute Inc. of Cary, North Carolina, USA. Merely for illustration, training application 122 may be implemented using or integrated with one or more SAS software tools such as JMP®, Base SAS, SAS® Enterprise Miner™, SAS® Event Stream Processing, SAS/STAT®, SAS® High Performance Analytics Server, SAS® Visual Data Mining and Machine Learning, SAS® LASR™, SAS® In-Database Products, SAS® Scalable Performance Data Engine, SAS® Cloud Analytic Services (CAS), SAS/OR®, SAS/ETS®, SAS® Econometrics, SAS® Visual Analytics, SAS® Viya™, and SAS In-Memory Statistics for Hadoop®, etc. all of which are developed and provided by SAS Institute Inc. of Cary, North Carolina, USA. Data mining, statistical analytics, and response prediction are practically applied in a wide variety of industries to solve technical problems.

Training application 122 may be implemented as a Web application. For example, training application 122 may be configured to receive hypertext transport protocol (HTTP)

responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Input dataset 124 may include, for example, a plurality of rows and a plurality of columns. The plurality of rows may be referred to as observation vectors or records (observations), and the columns may be referred to as variables. In an alternative embodiment, input dataset 124 may be transposed. The plurality of variables defines a vector x; for each observation vector i=1, 2, ..., N, where N is a number of the observation vectors included in input dataset 124. Input dataset 124 may include additional variables that are not included in the plurality of variables. One or more variables of the plurality of variables may describe a characteristic of a physical object. For example, if input dataset 124 includes data related to operation of a vehicle, the variables may include a type of vehicle, an oil pressure, a speed, a gear indicator, a gas tank level, a tire pressure for each tire, an engine temperature, a radiator level, etc. The plurality of variables may include a plurality of covariates from which a first set of covariates $x^{(1)}$ may be selected from the plurality of covariates to train a treatment model, and a second set of covariates $x^{(2)}$ may be selected from the plurality of covariates to train an outcome model. The plurality of variables further includes a treatment variable and an outcome variable.

In data science, engineering, and statistical applications, data often consists of multiple measurements (across sensors, characteristics, responses, etc.) collected across multiple time instances (patients, test subjects, etc.). These measurements may be collected in input dataset 124 for analysis and processing or streamed to model training device 100 as it is generated. Input dataset 124 may include data captured as a function of time for one or more physical objects. The data stored in input dataset 124 may be captured at different time points periodically, intermittently, when an event occurs, etc. Input dataset 124 may include data captured at a high data rate such as 200 or more observation vectors per second for one or more physical objects. One or more columns of input dataset 124 may include a time and/or date value. Input dataset 124 may include data captured under normal and abnormal operating conditions of the physical object.

The data stored in input dataset 124 may be received directly or indirectly from the source and may or may not be pre-processed in some manner. For example, the data may be pre-processed using an event stream processor such as the SAS® Event Stream Processing Engine (ESPE), developed and provided by SAS Institute Inc. of Cary, North Carolina, USA. For example, data stored in input dataset 124 may be generated as part of the Internet of Things (IoT), where things (e.g., machines, devices, phones, sensors) can be connected to networks and the data from these things collected and processed within the things and/or external to the things before being stored in input dataset 124. For example, the IoT can include sensors in many different devices and types of devices, and high value analytics can be applied to identify hidden relationships and drive increased efficiencies. This can apply to both big data analytics and real-time analytics. Some of these devices may be referred to as edge devices and may involve edge computing circuitry. These devices may provide a variety of stored or generated data, such as network data or data specific to the network devices themselves. Again, some data may be processed with an ESPE, which may reside in the cloud or in an edge device before being stored in input dataset 124.

The data stored in input dataset 124 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art.

Input dataset 124 may be stored on computer-readable medium 108 or on one or more computer-readable media of distributed computing system 130 and accessed by model training device 100 using communication interface 106, input interface 102, and/or output interface 104. Input dataset 124 may be stored in various compressed formats such as a coordinate format, a compressed sparse column format, a compressed sparse row format, etc. The data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observation vectors (rows) and variables (columns) that can be processed by one or more SAS software tools.

Input dataset 124 may be stored using various data structures as known to those skilled in the art including one or more files of a file system, a relational database, one or more tables of a system of tables, a structured query language database, etc. on model training device 100 or on distributed computing system 130. Model training device 100 may coordinate access to input dataset 124 that is distributed across distributed computing system 130 that may include one or more computing devices. For example, input dataset 124 may be stored in a cube distributed across a grid of computers as understood by a person of skill in the art. As another example, input dataset 124 may be stored in a multi-node Hadoop® cluster. For instance, Apache™ Hadoop® is an open-source software framework for distributed computing supported by the Apache Software Foundation. As another example, input dataset 124 may be stored in a cloud of computers and accessed using cloud computing technologies, as understood by a person of skill in the art. The SAS® LASR™ Analytic Server may be used as an analytic platform to enable multiple users to concurrently access data stored in input dataset 124. The SAS Viya open, cloud-ready, in-memory architecture also may be used as an analytic platform to enable multiple users to concurrently access data stored in input dataset 124. SAS CAS may be used as an analytic server with associated cloud services in SAS Viya. Some systems may use SAS In-Memory Statistics for Hadoop® to read big data once and analyze it several times by persisting it in-memory for the entire session. Some systems may be of other types and configurations.

Figure 2:
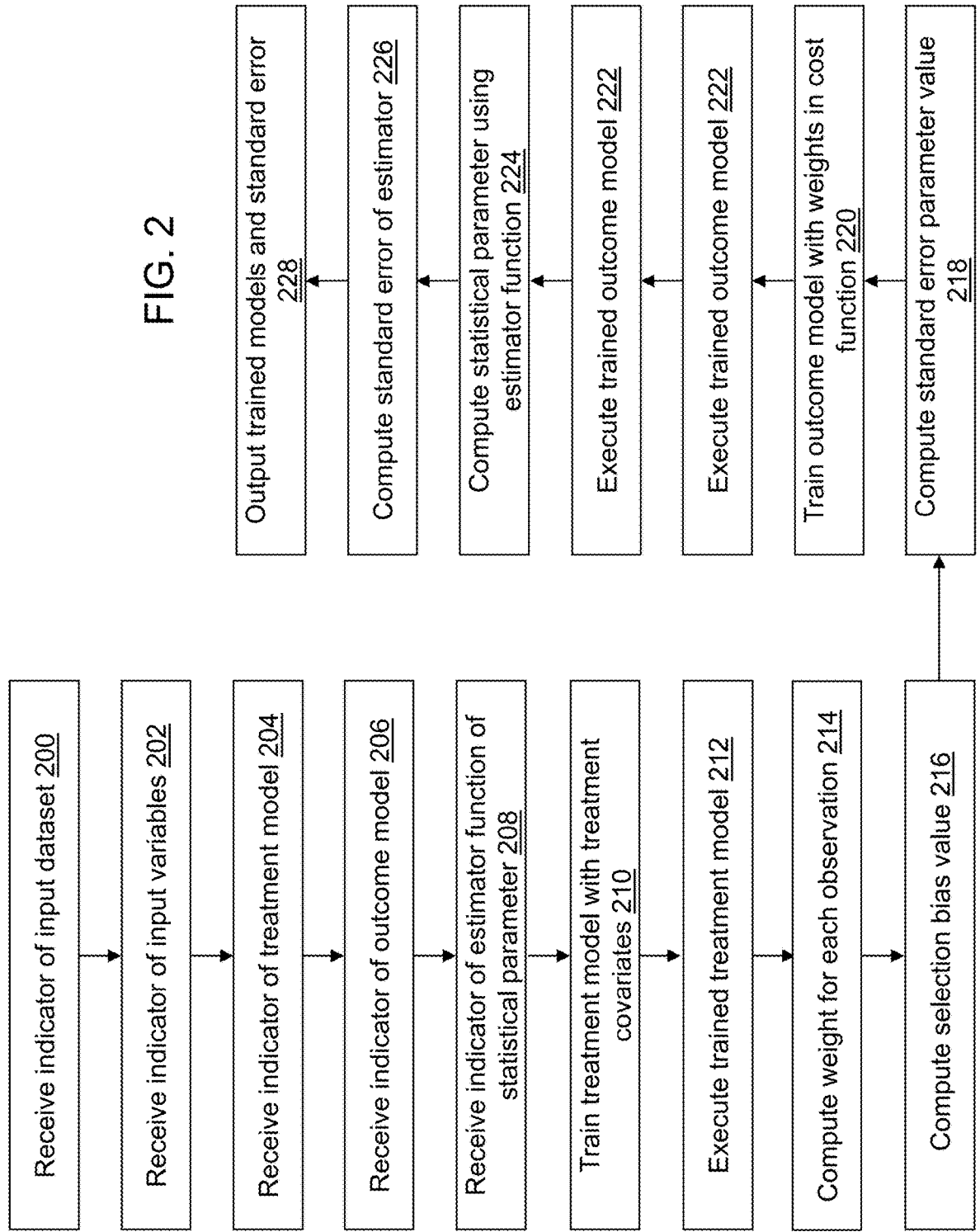
FIG. 2 depicts a flow diagram illustrating examples of operations performed by a training application of the model training device of FIG. 1 in accordance with an illustrative embodiment.

Referring to FIG. 2, example operations associated with training application 122 are described. Additional, fewer, or different operations may be performed depending on the embodiment of training application 122. The order of presentation of the operations of FIG. 2 is not intended to be limiting. Some of the operations may not be performed in some embodiments. Although some of the operational flows are presented in sequence, the various operations may be performed in various repetitions and/or in other orders than those that are illustrated. For example, a user may execute training application 122, which causes presentation of a first user interface window, which may include a plurality of menus and selectors such as drop-down menus, buttons, text boxes, hyperlinks, etc. associated with training application 122 as understood by a person of skill in the art. The plurality of menus and selectors may be accessed in various orders. An indicator may indicate one or more user selections from a user interface, one or more data entries into a data field of the user interface, one or more data items read from computer-readable medium 108 or otherwise defined with one or more default values, etc. that are received as an input by training application 122. The operations of training application 122 further may be performed in parallel using a plurality of threads and/or a plurality of worker computing devices.

In an operation 200, a first indicator may be received that indicates input dataset 124. For example, the first indicator indicates a location and a name of input dataset 124. As an example, the first indicator may be received by training application 122 after selection from a user interface window or after entry by a user into a user interface window. In an alternative embodiment, input dataset 124 may not be selectable. For example, a most recently created dataset may be used automatically. As understood by a person of skill in the art, input dataset 124 may be partitioned or otherwise divided into training, validation, and/or test datasets as part of training a neural network model and executing the trained neural network model to compute a performance score.

In an operation 202, a second indicator may be received that indicates a plurality of variables or features to include in training a model, such as a neural network model, using input dataset 124. For example, the second indicator may indicate a column number(s) or a column name(s) used to define each of the first set of covariates $x^{(1)}$, the second set of covariates $x^{(2)}$, the treatment variable t, and the outcome variable y.

In an operation 204, a third indicator may be received for a treatment model. The treatment model may be any machine learning model. For example, the third indicator indicates a name of a treatment model type for the treatment model that performs prediction such as determining a predicted treatment or action to take for each observation vector of input dataset 124. The third indicator may be received by training application 122 from a user interface window or after entry by a user into a user interface window. A default value for the treatment model type may further be stored, for example, in computer-readable medium 108. As an example, the treatment model type may be selected from "SVM", "K-Cluster", "Neural Network", "Logistic Regression", "Forest", "Gradient Boosting", "Decision Tree", "Factorization Machine", "Deep Neural Network", "Bayesian Deep Neural Network", etc. The model type indicated by "SVM" may refer to a support vector machine (SVM) model type. The model type indicated by "K-Cluster" may refer to a k-means clustering model type. The model type indicated by "Neural Network" may refer to a neural network model type. The model type indicated by "Logistic Regression" may refer to a logistic regression model type. The model type indicated by "Forest" may refer to a random forest model type. The model type indicated by "Gradient Boosting" may refer to a gradient boosting model type. The model type indicated by "Decision Tree" may refer to a decision tree model type. The model type indicated by "Factorization Machine" may refer to a factorization machine model type. The model type indicated by "Deep Neural Network" may refer to a deep neural network (DNN) machine model type. The model type indicated by "Bayesian Deep Neural Network" may refer to a Bayesian DNN machine model type. For example, a default model type may be indicated by "Deep Neural Network". Of course, the model type may be labeled or selected in a variety of different manners by the user as understood by a person of skill in the art. In an alternative embodiment, the model type may not be selectable, and a single model type is implemented by model training application 122. For example, the model type indicated as "Deep Neural Network" may be used by default or without allowing a selection. The model types "SVM", "K-Cluster", "Neural Network", "Logistic Regression", "Forest", "Gradient Boosting", "Decision Tree", "Factorization Machine", "Deep Neural Network", and "Bayesian Deep Neural Network" may be trained and scored using machine learning software from SAS Institute Inc. of Cary, NC, USA.

The third indicator may further indicate one or more hyperparameters to use for training and validating the indicated model type and/or values for an automatic tuning method (autotune option) as well as other training options such an objective function, training stop criteria, etc. For illustration, an automatic tuning process is described in U.S. Pat. Nos. 10,360,517; 10,600,005; 10,832,174; and 11,093,833. Hyperparameters define values or various options that govern a training process based on the model type. The default values of these hyperparameters may not be suitable for all applications. To reduce the effort in adjusting these hyperparameters, an automatic tuning process may be used to identify the best settings for the hyperparameters though the hyperparameters may optionally be selected as an input option by a user.

For illustration, the treatment model may be trained to regress t on $x^{(1)}$ to estimate £ for each observation vector using a DNN such that $\hat{t}=\hat{g}_{DNN}(x^{(1)})$. A default value for the DNN architecture may further be stored, for example, in computer-readable medium 108. For the treatment model, a negative log likelihood function is an illustrative loss function though other loss functions may be indicated or otherwise used. For illustration, the architecture defines a plurality of layers and their connectivity including a type of each layer. Illustrative layers include an input layer, a convolution layer, a rectified linear activation function (ReLU) layer, a pooling layer, an output layer, etc. A ReLU layer is a piecewise linear function that outputs the input directly if it is positive, and outputs zero otherwise. One or more hyperparameters may be defined for each layer that may vary based on a type of each layer. For example, an activation function, a number of neurons, a number of groups, a dropout rate, a height and/or a width of a convolution window, a number of filters, an initialization method for filter weights, width and height padding dimensions, a number of categories or labels or unique values of the target variable value, such as $t_i$, a detection threshold, etc. may be defined as hyperparameters for training the neural network.

A deep learning action set provided as part of SAS® Viya may be used to build the treatment model and add layers to the treatment model. In general, the treatment model includes an input layer that provides $x^{(1)}$ to hidden layers with the same or a different number of nodes on each hidden layer. A last layer of the hidden layers provides input to an output layer that computes a predicted treatment value when the treatment variable is of the continuous or count type or a predicted probability of assigning the treatment or different treatment categorical values when the treatment variable is of the binary or discrete type.

In an operation 206, a fourth indicator may be received for an outcome model. The outcome model may be any machine learning model. For example, the fourth indicator indicates a name of an outcome model type for the outcome model that performs prediction such as determining a predicted outcome given a treatment for each observation vector of input dataset 124. The fourth indicator may be received by training application 122 from a user interface window or after entry by a user into a user interface window. A default value for the outcome model type may further be stored, for example, in computer-readable medium 108. As an example, similar to the treatment model type, the outcome model type may be selected from "SVM", "K-Cluster", "Neural Network", "Logistic Regression", "Forest", "Gradient Boosting", "Decision Tree", "Factorization Machine", "Deep Neural Network", etc. The fourth indicator may further indicate one or more hyperparameters to use for training and validating the indicated outcome model type and/or values for an automatic tuning method (autotune option) as well as other training options such an objective function, training stop criteria, etc.

For illustration, the outcome model may be trained to regress y on $x^{(2)}$ and t or $\hat{t}$ using a DNN such that $\hat{y}=\hat{f}_{DNN}(x^{(2)}, t)$. A default architecture for the DNN architecture may further be stored, for example, in computer-readable medium 108. $x^{(2)}$ may be identical to $x^{(1)}$. IPTW may be used for debiasing.

In an operation 208, a fifth indicator may be received that indicates an estimator function to estimate a statistical parameter such as a potential outcome $\hat{r}$ from the outcome model. In another illustrative embodiment, the estimator function may be an average over all individuals. For example, the estimator function for the potential outcome $$Y(t) = E_X(Y \mid T=t) \text{ is } \hat{r}(t) = \frac{1}{N}\sum_{i=1}^{N} \hat{f}_{DNN}(x_i^{(2)}, t),$$

where N is the sample size, $x_i^{(2)}$ is the covariates for observation or individual i, and t is the specific treatment value of interest (noting that t is not $t_i$, the observed treatment value that the individual i receives). In another illustrative embodiment, the estimator function may use a finite difference method because the definition of the statistical parameter of interest requires a derivative. For example, the estimator function for the average partial effects (APE) is $$\hat{r}(t) = E_X\left(\frac{\partial y}{\partial t}\right) = \frac{1}{N}\sum_{i=1}^{N} \frac{\hat{f}_{DNN}(x_i^{(2)}, t+\varepsilon) - \hat{f}_{DNN}(x_i^{(2)}, t-\varepsilon)}{2\varepsilon},$$

where $\varepsilon$ is a user-specified small positive value such as $10^{-8}$.

In an operation 210, the treatment model defined in operation 204 is trained with a treatment variable value $t_i$ and covariate values for the first set of covariates $x_i^{(1)}$ read from input dataset 124 for each observation vector i of the N observation vectors to regress t on $x^{(1)}$ to estimate $\hat{t}$ for each observation vector of the N observation vectors. The training process optimizes the loss function based on the target variable that is the treatment variable t that includes a treatment value for each observation vector. In an illustrative embodiment, a double/debiased machine learning method such as that described in a paper by Victor Chernozhukov, et al. titled *Double/Debiased Machine Learning for Treatment and Structural Parameters* and published in The Econometrics Journal, volume 21, issue 1 on Feb. 1, 2018 on pages C1-C68 or a sample-split technique may be used. For example, the observation vectors in input dataset 124 may be divided randomly into k folds with an ith fold held out. The remaining (k−1) folds of observation vectors are used to train the treatment model and the ith fold of observation vectors is used to compute the estimated value to get $\hat{f}^{(i)}(\bullet)$, i=1, . . . , k. All of the k fold estimations become $\hat{f}(\bullet)$.

In an operation 212, the trained treatment model is executed with the covariate values for the first set of covariates $x^{(1)}$ read from input dataset 124 for each observation vector of the N observation vectors to estimate the treatment variable value $\hat{t}$ for each observation vector of the N observation vectors.

In an operation 214, a weight value $w_i$ is computed for each observation vector of the N observation vectors. Various functions may be used to compute the weight value. For illustration, using IPTW when assuming that the treatment value follows a Gaussian distribution centered around an estimated treatment value, $$w_i = w(t_i, \hat{t}_i) = \exp\left(\frac{(t_i - \hat{t}_i)^2}{v}\right), i = 1, \ldots, N,$$

where $v=\hat{\sigma}^2$ indicates a variance of the estimated treatment values, and $\hat{\sigma}$ indicates a standard deviation of the estimated treatment values computed in operation 212. For example, $$v = \frac{1}{N}\sum_{i=1}^{N}(\hat{t}_i - t_i)^2.$$

The weight values further can be normalized or truncated.

In an operation 216, a selection bias value $S_b$ is computed using a first variance value $v_1$ computed using the treatment variable values $t_i$, i=1, . . . , N and using a second variance value $v_2$ computed using the treatment variable values $t_i$, i=1, . . . , N and the estimated treatment variable values $$\hat{t}_i, i = 1, \ldots, N. \; S_b = \frac{v_1}{v_2},$$

where $$v_1 = \frac{1}{N}\sum_{i=1}^{N}(t_i - \bar{t})^2, \bar{t} = \frac{1}{N}\sum_{i=1}^{N} t_i,$$

and $$v_2 = \frac{1}{N}\sum_{i=1}^{N}(\hat{t}_i - t_i)^2.$$

The computation is based on the principle that the better the treatment can be predicted, the more selection bias the covariates introduce.

In an operation 218, a standard error parameter value SEP is computed, for example, using $$SEP = \left(\frac{N}{S_b}\right)^{0.2}.$$

Linear regression may have been used on a log transform of the variables N and $S_b$ to find a convergence rate for the estimator function as $\beta_1 \log(N) + \beta_2 \log(S_b)$ to determine that $\widehat{\beta_1} \approx -\widehat{\beta_2} \approx 0.2$ for a DNN. For example, after collecting 95% quantiles of an estimator's distribution from 1500 simulated trials based on five different data generating processes (DGPs) with three different sample size per DGP and 100 trials per sample size, a convergence rate was computed.

In an operation 220, the outcome model defined in operation 206 is trained with the outcome variable value $y_i$ and covariate values for the second set of covariates $x_i^{(2)}$ read from input dataset 124 for each observation vector i of the N observation vectors to regress y on $x^{(2)}$ and the treatment variable value t for each observation vector of the N observation vectors. Again, in an illustrative embodiment, a similar training method to that described with respect to the treatment model may be used. The loss function may include the weight value $w_i$. The second set of covariates $x^{(2)}$ are the variables input to the outcome model and the estimated outcome $\hat{y}$ may be computed according to the equation $\hat{y} = \hat{f}(x^{(2)}, t)$.

In an operation 222, the trained outcome model $\hat{f}(\ )$ is executed with the covariate values for the second set of covariates $x^{(2)}$ read from input dataset 124 for each observation vector of the N observation vectors and the treatment variable value t to estimate the outcome variable y for each observation vector of the N observation vectors. To compute the estimated potential outcome value, $\hat{y}_i = \hat{f}(x^{(2)}, t)$, i=1, ..., N is computed by executing the trained outcome model $\hat{f}(\ )$ To compute the estimated APE, the trained outcome model $\hat{f}(\ )$ is executed twice, once to compute $\hat{y}_{i,+} = \hat{f}(x_i^{(2)}, t+\varepsilon)$, i=1, ..., N and once to compute $\hat{y}_{i,-} = \hat{f}(x_i^{(2)}, t-\varepsilon)$, i=1, ..., N.

For potential outcome estimation, a grid of treatment variable values is used. For each treatment variable value in the grid of treatment variable values, the trained outcome model $\hat{f}(\ )$ is executed for each observation vector of the N observation vectors with the respective treatment variable grid value. For example, the grid may include 100 different treatment variable values. For illustration, the grid of values may be selected by a user using a minimum value, a maximum value, and an increment value or using a list of values.

In an operation 224, a statistical parameter estimate is computed for each observation vector of the N observation vectors using the estimator function indicated in operation 208. For example, $\hat{r}_i = \hat{y}_i$, i=1, ..., N when the statistical parameter is the potential outcome. To create a dose-response curve, $\hat{r}_i^{(j)} = \hat{f}(x_i^{(2)}, t^{(j)})$, i=1, ..., N, j=1, ..., M, where M indicates a number of possible treatment values. In an alternative embodiment, the APE is the statistical parameter and $$\hat{r}_i = \frac{\hat{y}_{i,+} - \hat{y}_{i,-}}{2\varepsilon}, i = 1, \ldots, N.$$

In an operation 226, a standard error value SE of the estimator is computed using a third variance value computed from the statistical parameter variable values, $$v_3 = \frac{1}{N}\sum_{i=1}^{N}(\hat{y}_i - \overline{\hat{y}}_i)^2,$$

where $$\overline{\hat{y}}_i = \frac{1}{N}\sum_{i=1}^{N}\hat{y}_i.$$

For example, for the estimator of the potential outcome, $$SE = \sqrt{\frac{v_3}{SEP}}.$$

In another example, for the estimator of the APE, $$SE = \left(\frac{v_3}{2*SEP^2}\right)^{1/3}$$

where $$\varepsilon = \left(\frac{v_3}{2*SEP^2}\right)^{1/6}$$

to minimize the mean squared error of the estimator $\hat{r}(t)$. In an alternative embodiment, a confidence interval of the estimator can be computed in addition to or in the alternative to the standard error based on a predefined percent value such as 95% as understood by a person of skill in the art.

In an operation 228, the trained outcome model and/or the trained treatment model are output. For example, the trained outcome model and/or the trained treatment model may be output to trained model description 126. The standard error value SE may further be output to a table, to display 116, etc.

Five different kinds of data generating processes (DGPs) were executed to test training application 122. For each DGP, three sample sizes were generated for N=5,000, 10,000, 50,000. For each sample size, 100 trials were simulated. For each trial, the potential outcome was estimated for 100 different treatment values. That is, 150,000=5×3×100×100 potential outcome estimators and their confidence intervals were computed and compared to the true values. A first experiment was based on the same simulation described in section 5.1 of the Colangelo paper:

$$t = \Phi(3X'\theta) + 0.75v - 0.5$$
$$y = 1.2t + 1.2X'\theta + t^2 + tX_1 + \varepsilon$$

where $$v \sim N(0, 1), \varepsilon \sim N(0, 1), X =$$
$$(X_1, \ldots, X_{100})' \sim N\left(0, \sum\right), \theta_j = \frac{1}{j^2}, \text{diag}\left(\sum\right) = 1,$$

the (i, j)-entry $\Sigma_{ij}=0.5$ for $|i-j|=1$ and $\Sigma_{ij}=0$ for $|i-j|>1$ for i, j=1, ..., 100, and $\Phi$ is the cumulative distribution function of N(0,1). Thus, the potential outcome was $Y(t)=E_X(1.2t+1.2X'\theta+t^2+tX_1)=1.2t+t^2$.

Figure 3A:
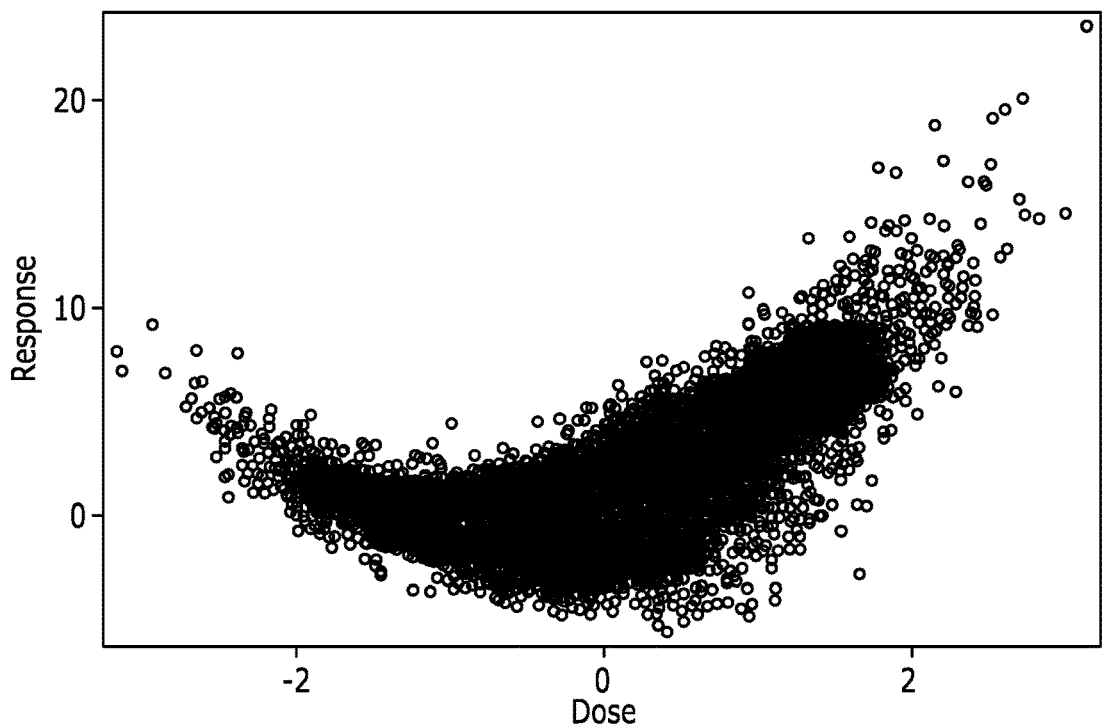
FIG. 3AA provides dose response data for a first dataset in accordance with an illustrative embodiment.
Figure 3A:
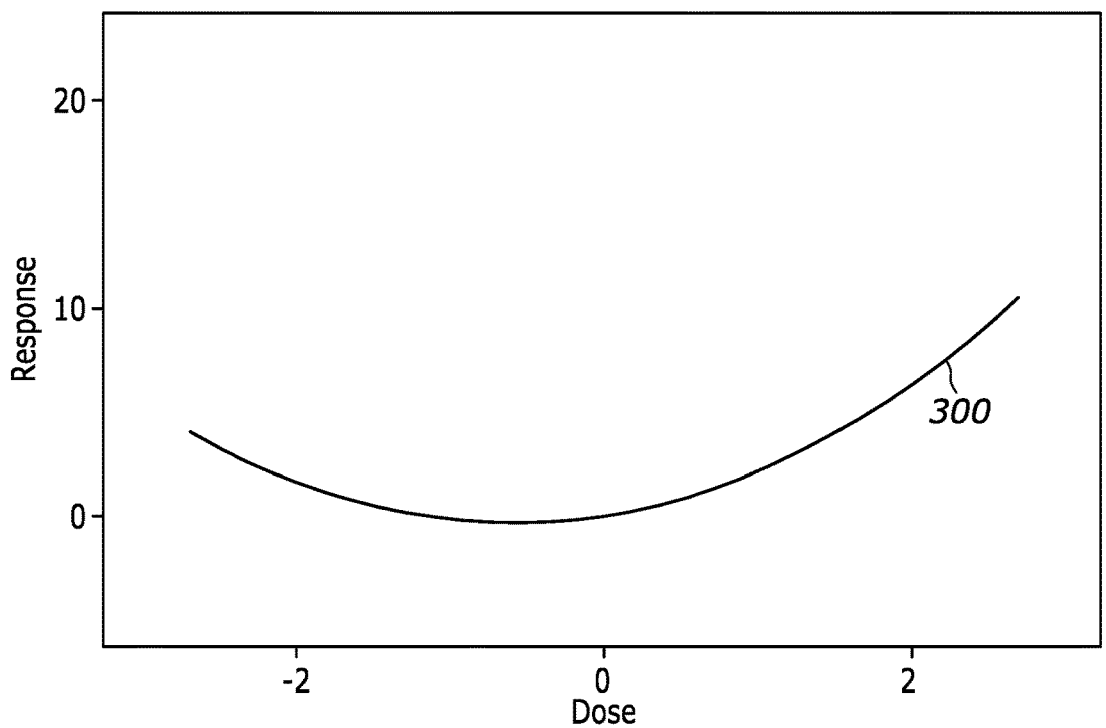

Referring to FIG. 3AA, the simulated data is shown for one trial, where the simulated data is shown by the open circles. Referring to FIG. 3AB, a true dose-response curve 300 is shown for one trial. Referring to FIG. 3B, the estimator results for a randomly selected trial are shown using the estimator described in the Colangelo paper. A first response curve 302 shows the true response for the selected trial, and a second response curve 304 shows the estimated response for the selected trial. Though not visible a confidence interval is shown. The coverage rate for the 95% CI was only 16%.

Figure 3C:
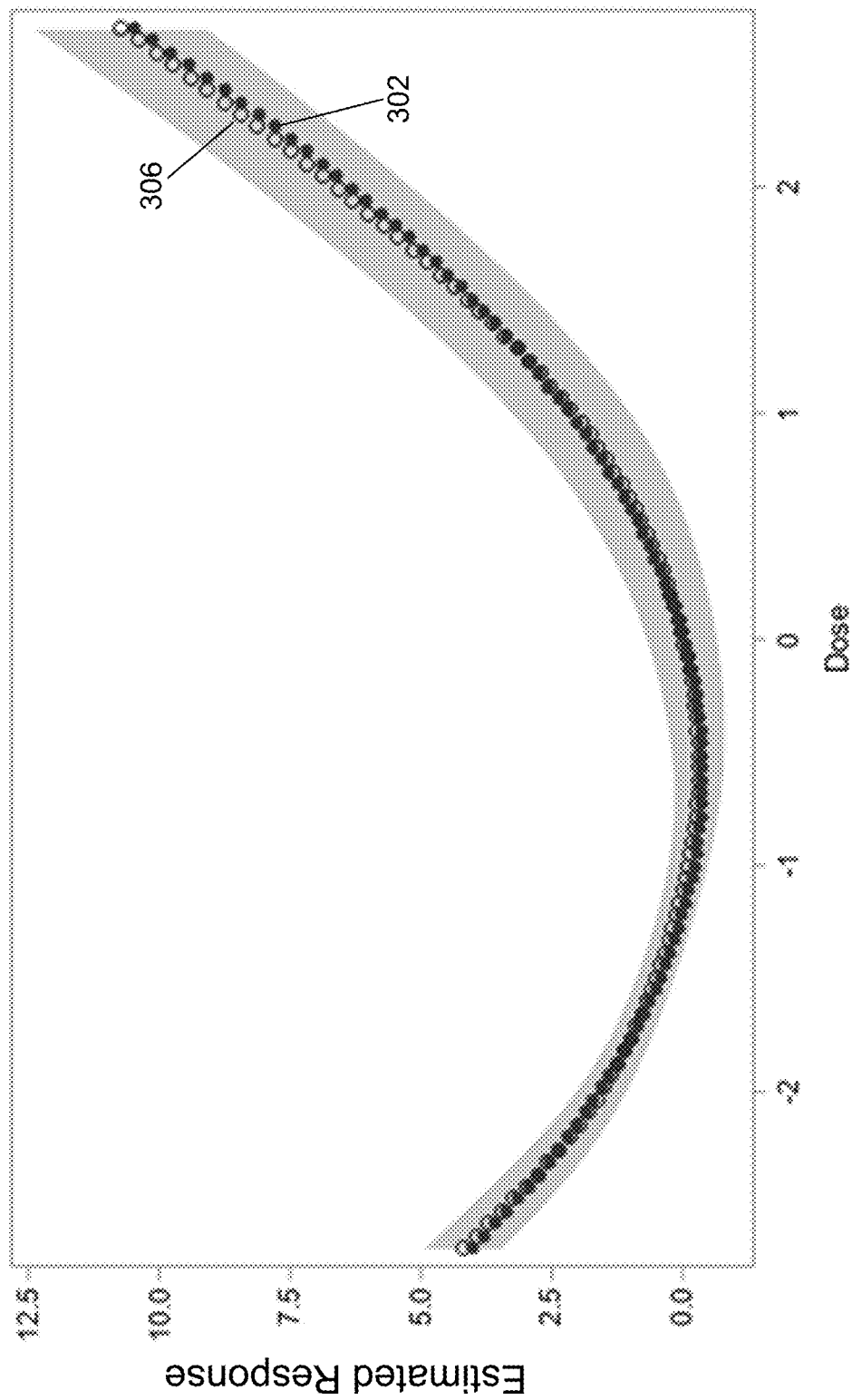
FIG. 3C provides an estimated response for the first dataset using the training application of FIG. 2 to compute the standard error in accordance with an illustrative embodiment.

Referring to FIG. 3C, the estimator results for the same randomly selected trial are shown using training application 122 with DNNs selected for both the treatment model and the outcome model and with the estimator function of the statistical parameter being that of the potential outcome. A third response curve 306 shows the estimated response for the selected trial. The confidence interval is in gray for each treatment value (dose). The coverage rate for the 95% CI was 100% meaning that the standard error of the estimator as calculated in operation 226 provided a much better representation of the confidence interval.

Figure 3D:
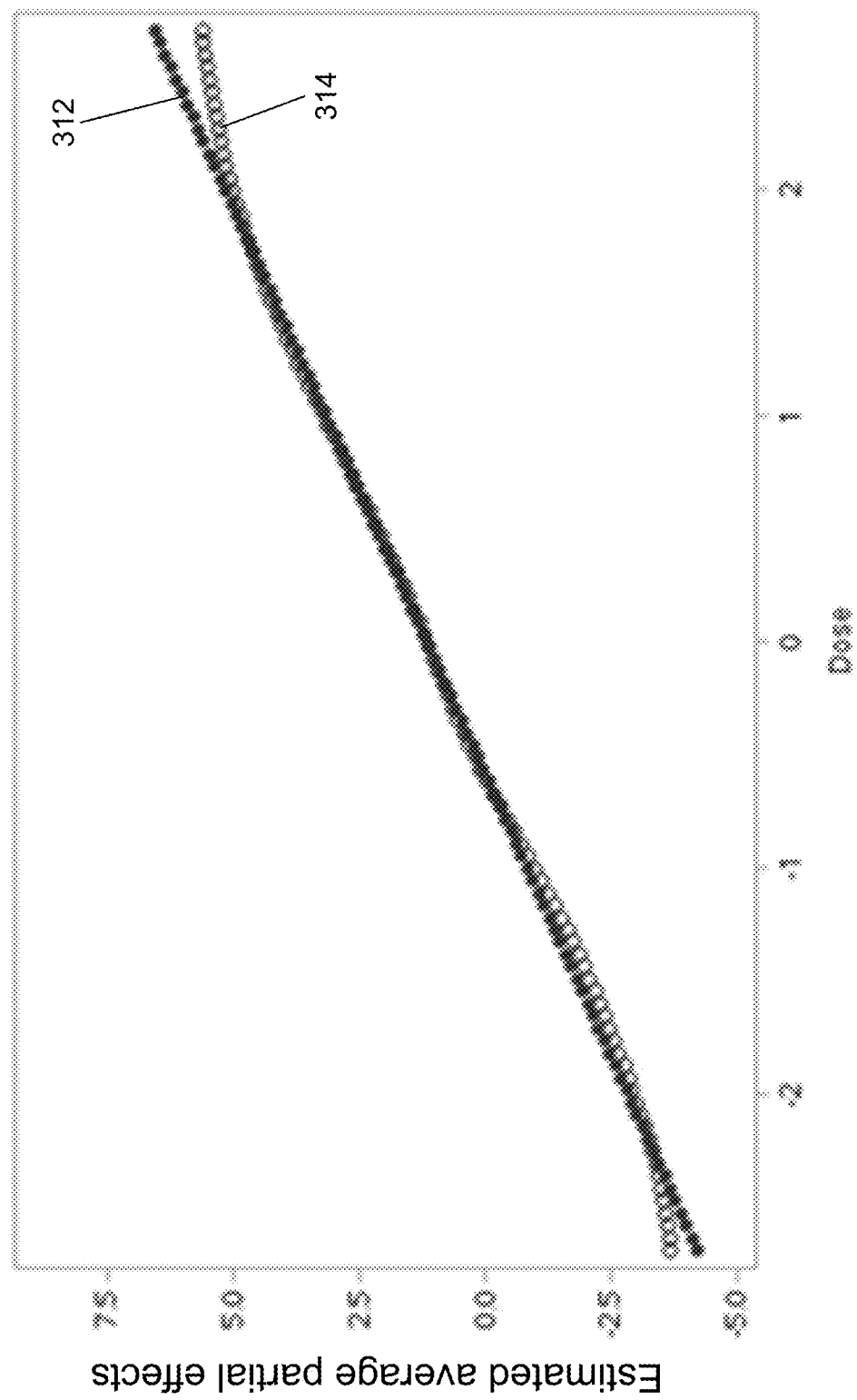
FIG. 3D provides an estimated average partial effect for the first dataset using the existing method to compute the standard error in accordance with an illustrative embodiment.

Referring to FIG. 3D, the estimator results for the randomly selected trial are shown using the estimator $$\sigma_{\hat{r}(t)} = \frac{1}{\sqrt{2}}\left(\frac{1}{2}\frac{v_3}{SEP^2}\right)^{-\frac{1}{6}}\sigma_{Y(t)}^{(CL)}, \sigma_{Y(t)}^{(CL)} = \frac{\sqrt{v_3}}{\sqrt{N}}$$

described in the Colangelo paper to estimate the standard error for the APE. A first APE curve 312 shows the true APE for the selected trial, and a second APE curve 314 shows the estimated APE for the selected trial. Though not visible a confidence interval is shown. The coverage rate for the 95% CI was only 43%.

Figure 3E:
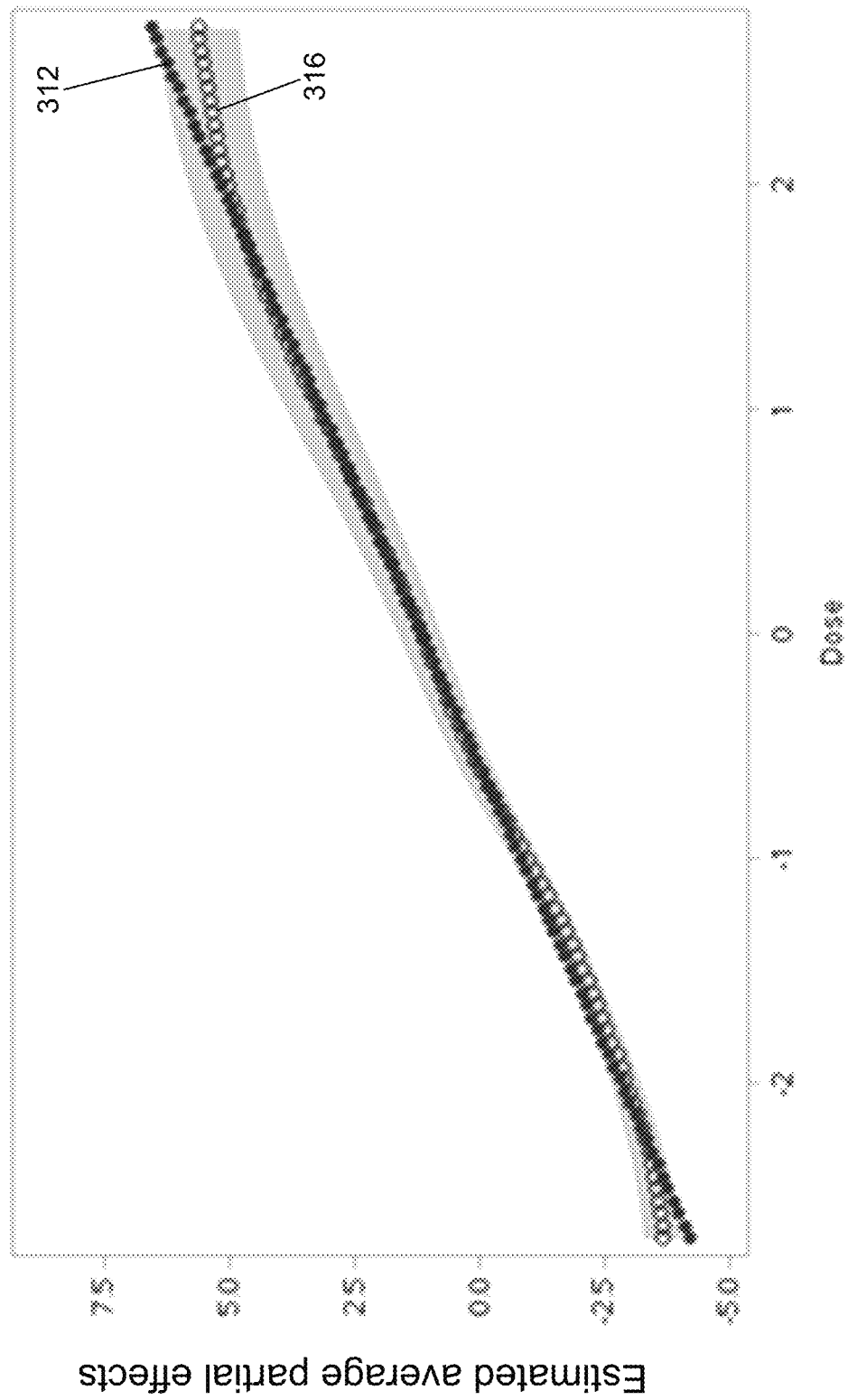
FIG. 3E provides an estimated average partial effect for the first dataset using the training application of FIG. 2 to compute the standard error in accordance with an illustrative embodiment.

Referring to FIG. 3E, the estimator results for the same randomly selected trial are shown using training application 122 with DNNs selected for both the treatment model and the outcome model and with the estimator function of the statistical parameter being that of the APE. A third APE curve 316 shows the estimated APE for the selected trial. The confidence interval is in gray for each treatment value (dose). The coverage rate for the 95% CI was 95% meaning that the standard error of the estimator as calculated in operation 226 for the APE provided a much better representation of the confidence interval.

A second experiment was based on:

$$t = (0.3 \sin(\pi x_1) + 0.7 u)x_2 + (0.1 \sin(\pi x_1) + 0.9 u)(1-x_2)$$
$$a = (3.25 + 2(x_1 - 0.5))x_2 + (3 + 2(x_1 - 0.5))(1-x_2)$$
$$b = (3 - 1(x_1 - 0.5))x_2 + (2.75 - 2(x_1 - 0.5))(1-x_2)$$
$$y = 25(1-x_1)e^{((a-1)\log(t)+(b-1)\log(1-t))} + \eta$$

where $x_2 \sim \text{Ber}(0.5)$, $x_1 \sim U(0,1)$, $u \sim U(0,1)$, $\eta \sim U(0,1)$, and $Y(t)=E_X(25(1-x_1)e^{((a-1)\log(t)+(b-1)\log(1-t))}+0.5)$.

Figure 4A:
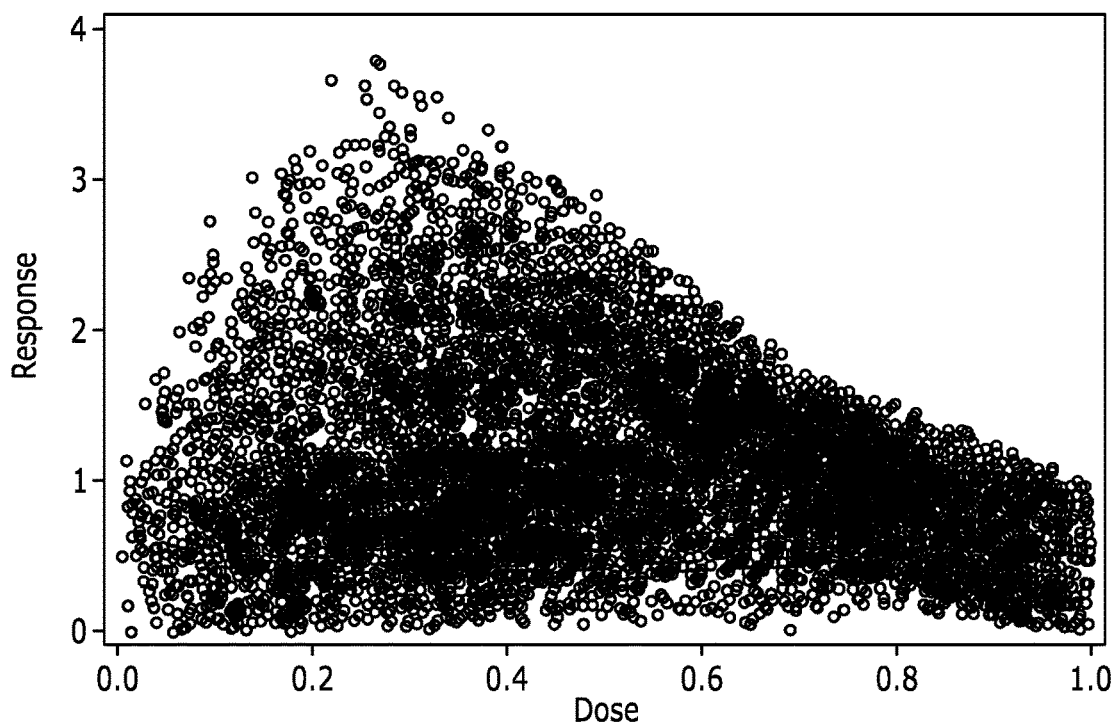
FIG. 4AA provides dose response data for a second dataset in accordance with an illustrative embodiment.
Figure 4A:
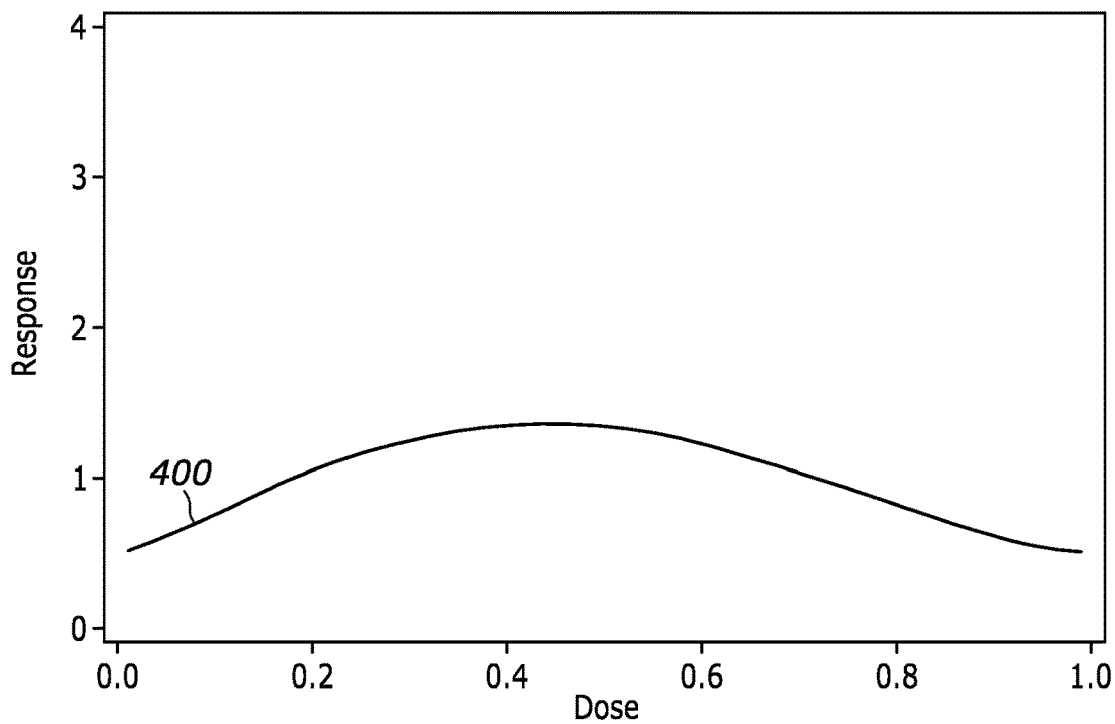

Referring to FIG. 4AA, the simulated data is shown for one trial, where the simulated data is shown by the open circles. Referring to FIG. 4AB, a true dose-response curve 400 is shown for one trial. Referring to FIG. 4B, the estimator results for a randomly selected trial are shown using the estimator described in the Colangelo paper. A first response curve 402 shows the true response for the selected trial, and a second response curve 404 shows the estimated response for the selected trial. Though not visible a confidence interval is shown. The coverage rate for the 95% CI was 40%.

Figure 4C:
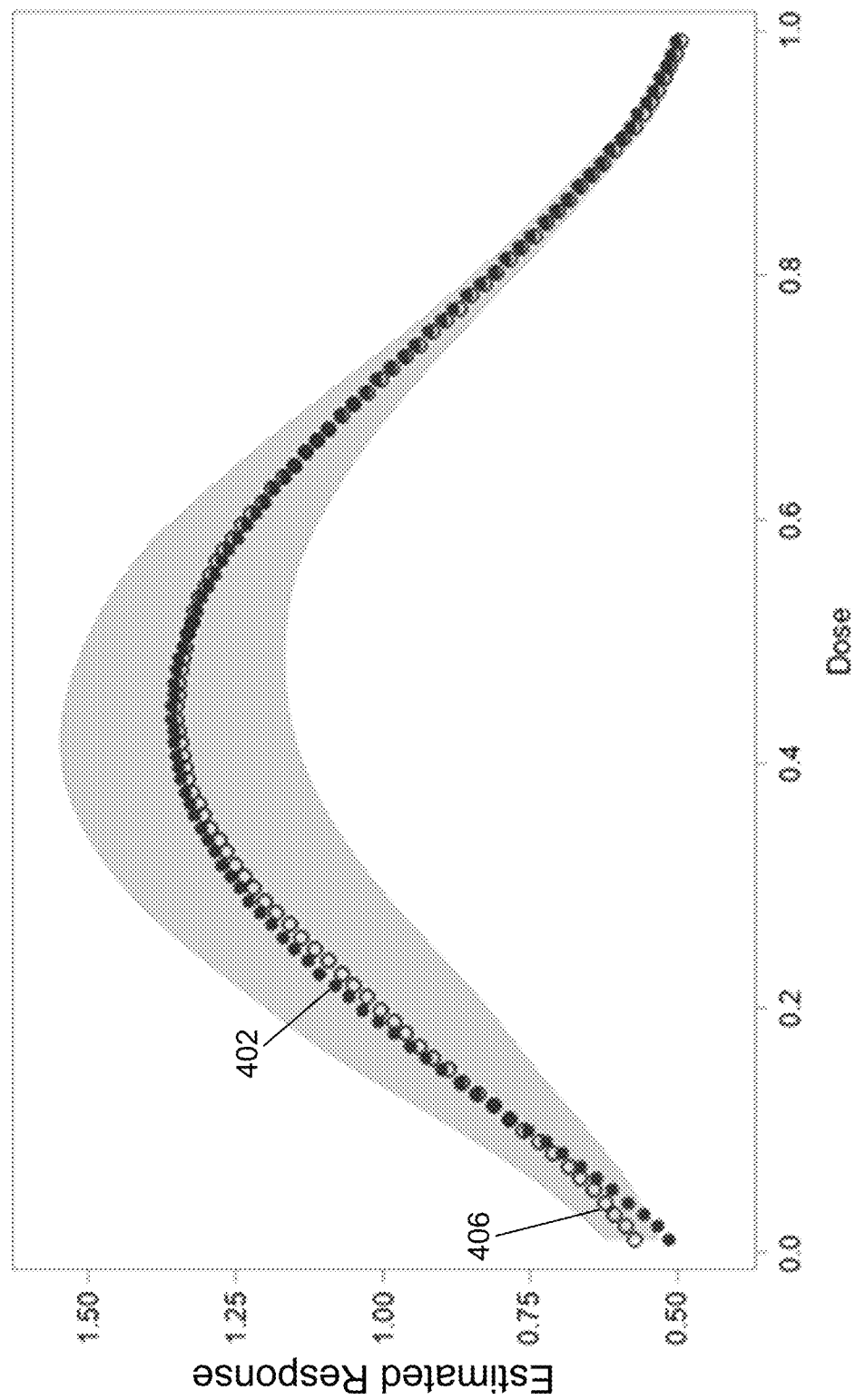
FIG. 4C provides an estimated response for the second dataset using the training application of FIG. 2 to compute the standard error in accordance with an illustrative embodiment.

Referring to FIG. 4C, the estimator results for the same randomly selected trial are shown using training application 122 with DNNs selected for both the treatment model and the outcome model and with the estimator function of the statistical parameter being that of the potential outcome. A third response curve 406 shows the estimated response for the selected trial. The confidence interval is in gray for each treatment value (dose). The coverage rate for the 95% CI was 98% meaning that the standard error of the estimator as calculated in operation 226 provided a much better representation of the confidence interval.

A third experiment was based on:

$$t = (0.6 \sin(\pi x_1) + 0.4 u)x_2 + (0.4 \sin(\pi x_1) + 0.6 u)(1-x_2)$$
$$a = (3.25 + 2(x_1 - 0.5))x_2 + (3 + 2(x_1 - 0.5))(1-x_2)$$
$$b = (3 - 1(x_1 - 0.5))x_2 + (2.75 - 2(x_1 - 0.5))(1-x_2)$$
$$y = 25(1-x_1)e^{((a-1)\log(t)+(b-1)\log(1-t))} + \eta$$

where $x_2 \sim \text{Ber}(0.5)$, $x_1 \sim U(0,1)$, $u \sim U(0,1)$, $\eta \sim U(0,1)$, and $Y(t)=E_X(25(1-x_1)e^{((a-1)\log(t)+(b-1)\log(1-t))}+0.5)$. Only the treatment model changed relative to the second experiment.

Figure 5A:
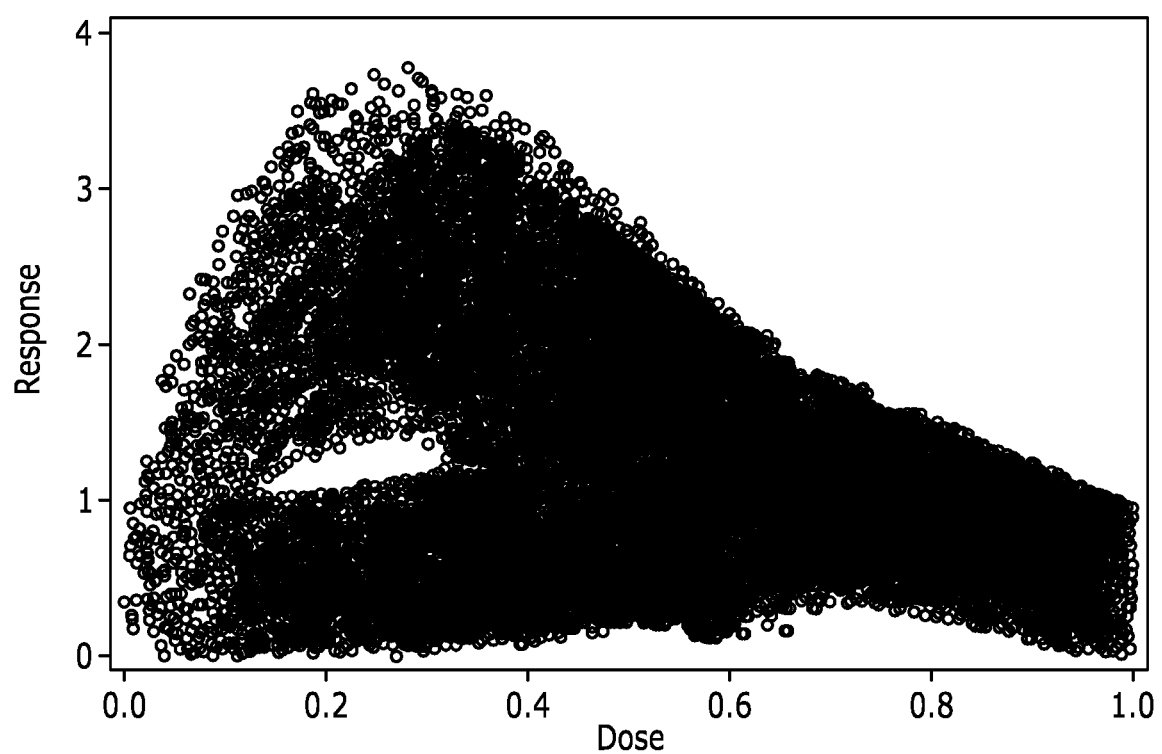
FIG. 5A provides dose response data for a third dataset in accordance with an illustrative embodiment.
Figure 5B:
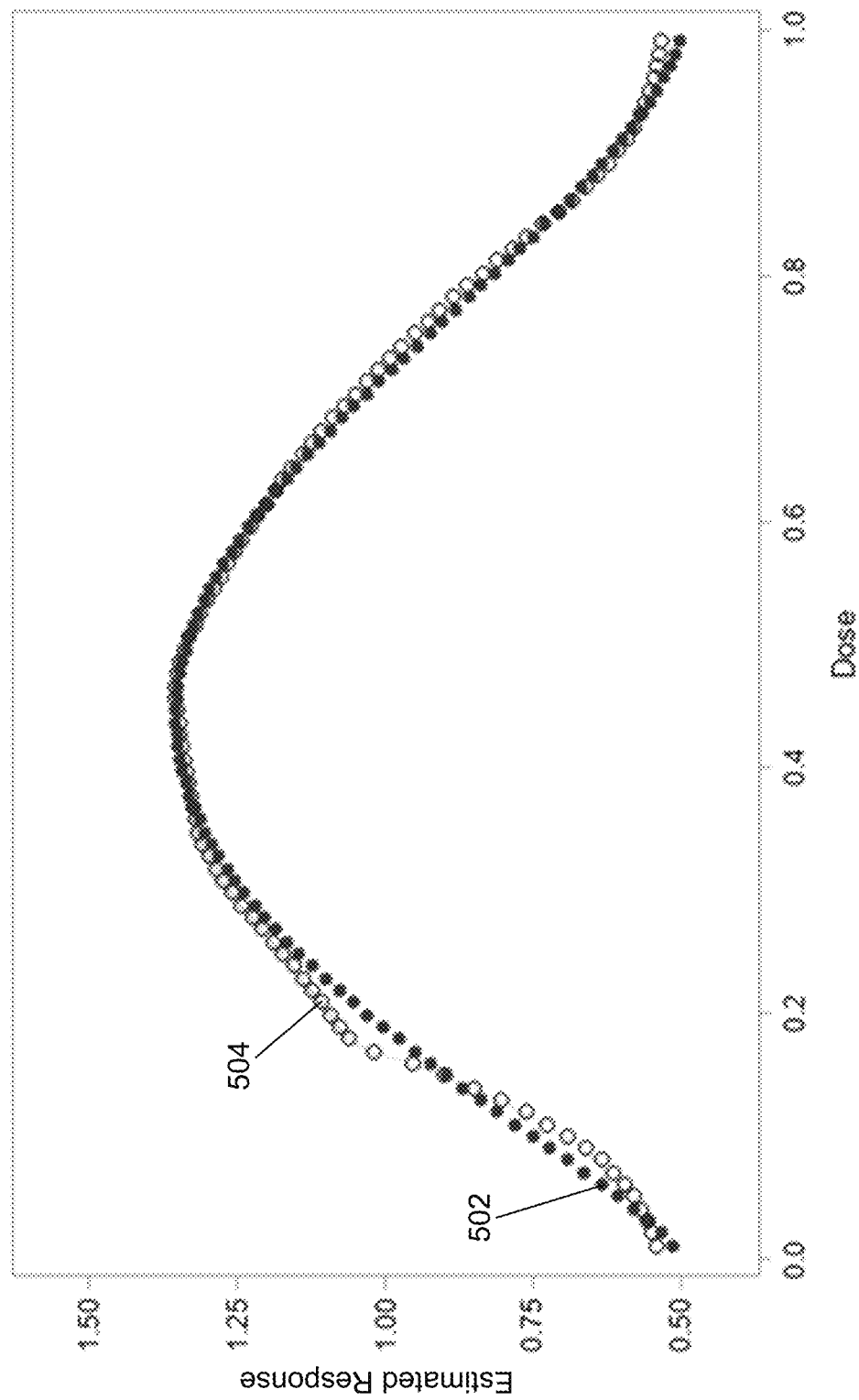
FIG. 5B provides an estimated response for the third dataset using an existing method to compute the standard error in accordance with an illustrative embodiment.

Referring to FIG. 5A, the simulated data is shown for one trial, where the simulated data is shown by the open circles. Referring to FIG. 4AB, true dose-response curve 400 is shown for one trial. Referring to FIG. 5B, the estimator results for a randomly selected trial are shown using the estimator described in the Colangelo paper. A first response curve 502 shows the true response for the selected trial, and a second response curve 504 shows the estimated response for the selected trial. Though not visible a confidence interval is shown. The coverage rate for the 95% CI was 20%.

Figure 5C:
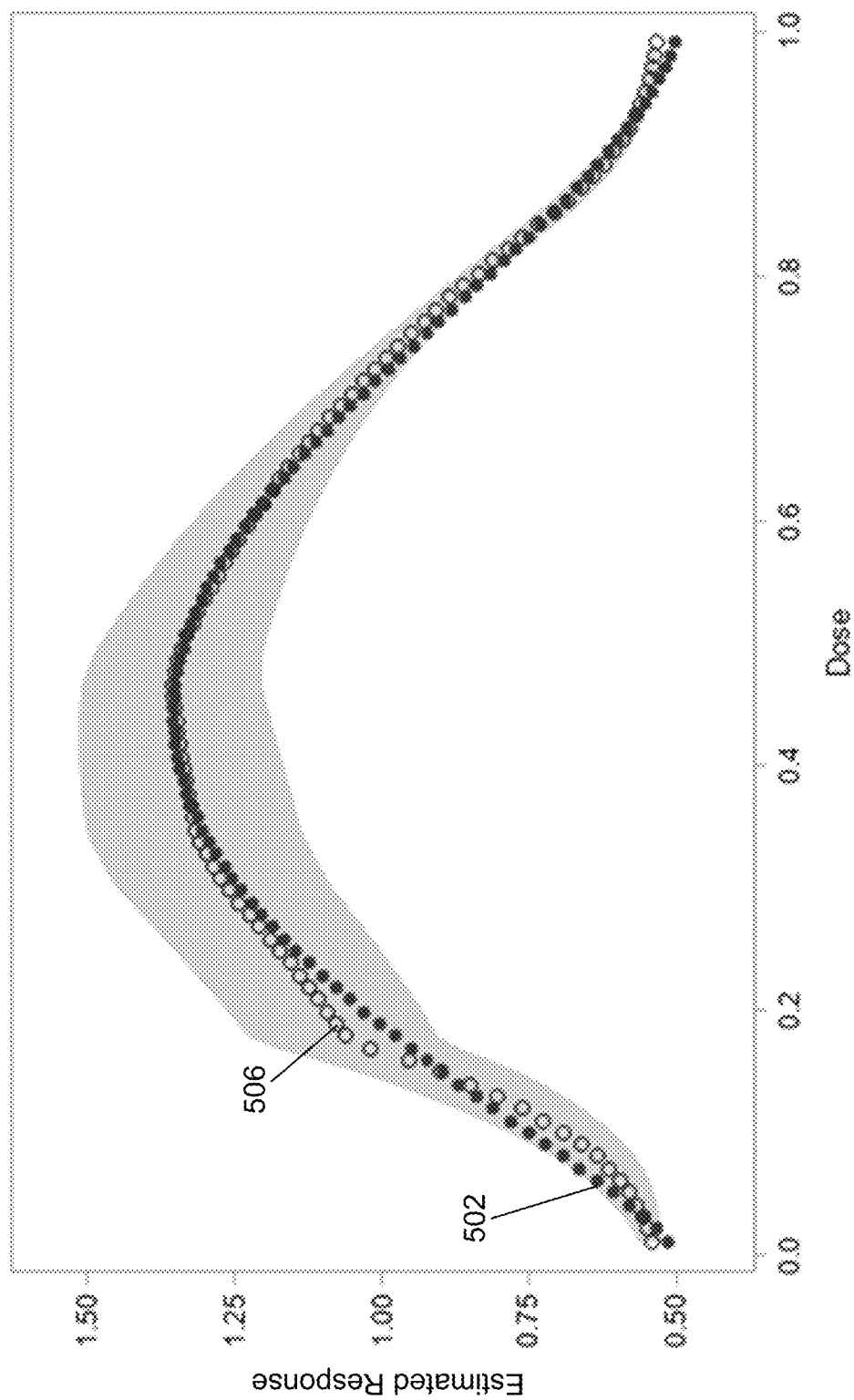
FIG. 5C provides an estimated response for the third dataset using the training application of FIG. 2 to compute the standard error in accordance with an illustrative embodiment.

Referring to FIG. 5C, the estimator results for the same randomly selected trial are shown using training application 122 with DNNs selected for both the treatment model and the outcome model and with the estimator function of the statistical parameter being that of the potential outcome. A third response curve 506 shows the estimated response for the selected trial. The confidence interval is in gray for each treatment value (dose). The coverage rate for the 95% CI was 95% meaning that the standard error of the estimator as calculated in operation 226 provided a much better representation of the confidence interval.

A fourth experiment was based on:

$$t = (0.9 \sin(\pi x_1) + 0.1 u)x_2 + (0.7 \sin(\pi x_1) + 0.3 u)(1-x_2)$$
$$a = (3.25 + 2(x_1 - 0.5))x_2 + (3 + 2(x_1 - 0.5))(1-x_2)$$
$$b = (3 - 1(x_1 - 0.5))x_2 + (2.75 - 2(x_1 - 0.5))(1-x_2)$$
$$y = 25(1-x_1)e^{((a-1)\log(t)+(b-1)\log(1-t))} + \eta$$

where $x_2 \sim Ber(0.5)$, $x_1 \sim U(0,1)$, $u \sim U(0,1)$, $\eta \sim U(0,1)$, and $Y(t)=E_X(25(1-x_1)e^{((a-1)log(t)+(b-1)log(1-t))}+0.5)$. Only the treatment model changed relative to the second experiment.

Figure 6A:
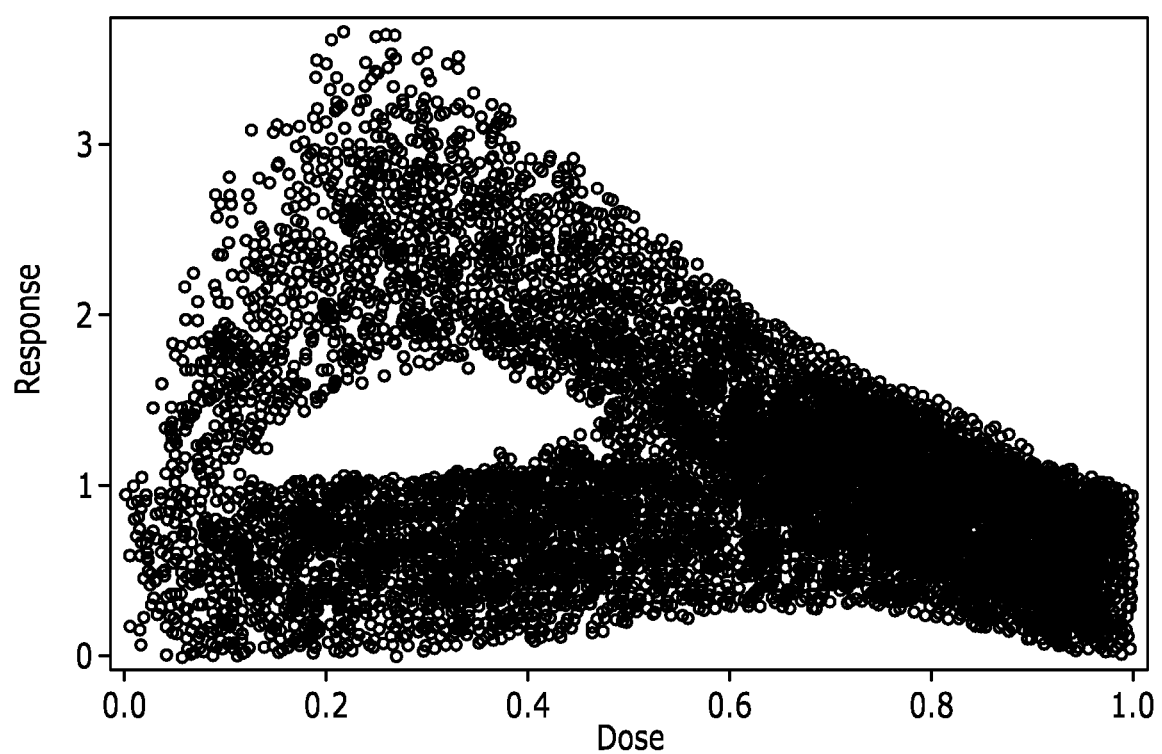
FIG. 6A provides dose response data for a fourth dataset in accordance with an illustrative embodiment.
Figure 6B:
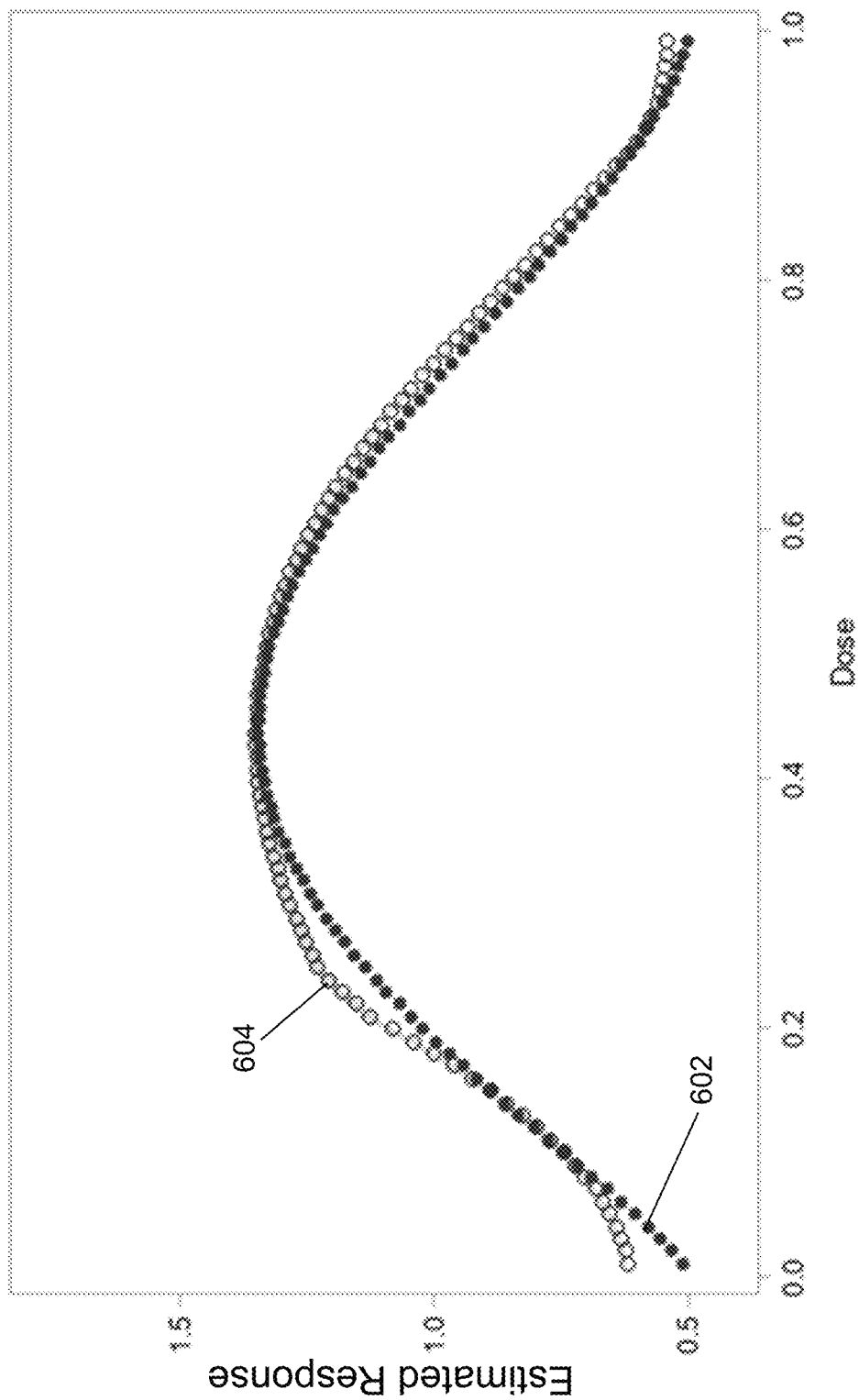
FIG. 6B provides an estimated response for the fourth dataset using an existing method to compute the standard error in accordance with an illustrative embodiment.

Referring to FIG. 6A, the simulated data is shown for one trial, where the simulated data is shown by the open circles. Referring to FIG. 4AB, true dose-response curve 400 is shown for one trial. Referring to FIG. 6B, the estimator results for a randomly selected trial are shown using the estimator described in the Colangelo paper. A first response curve 602 shows the true response for the selected trial, and a second response curve 604 shows the estimated response for the selected trial. Though not visible a confidence interval is shown. The coverage rate for the 95% CI was 22%.

Figure 6C:
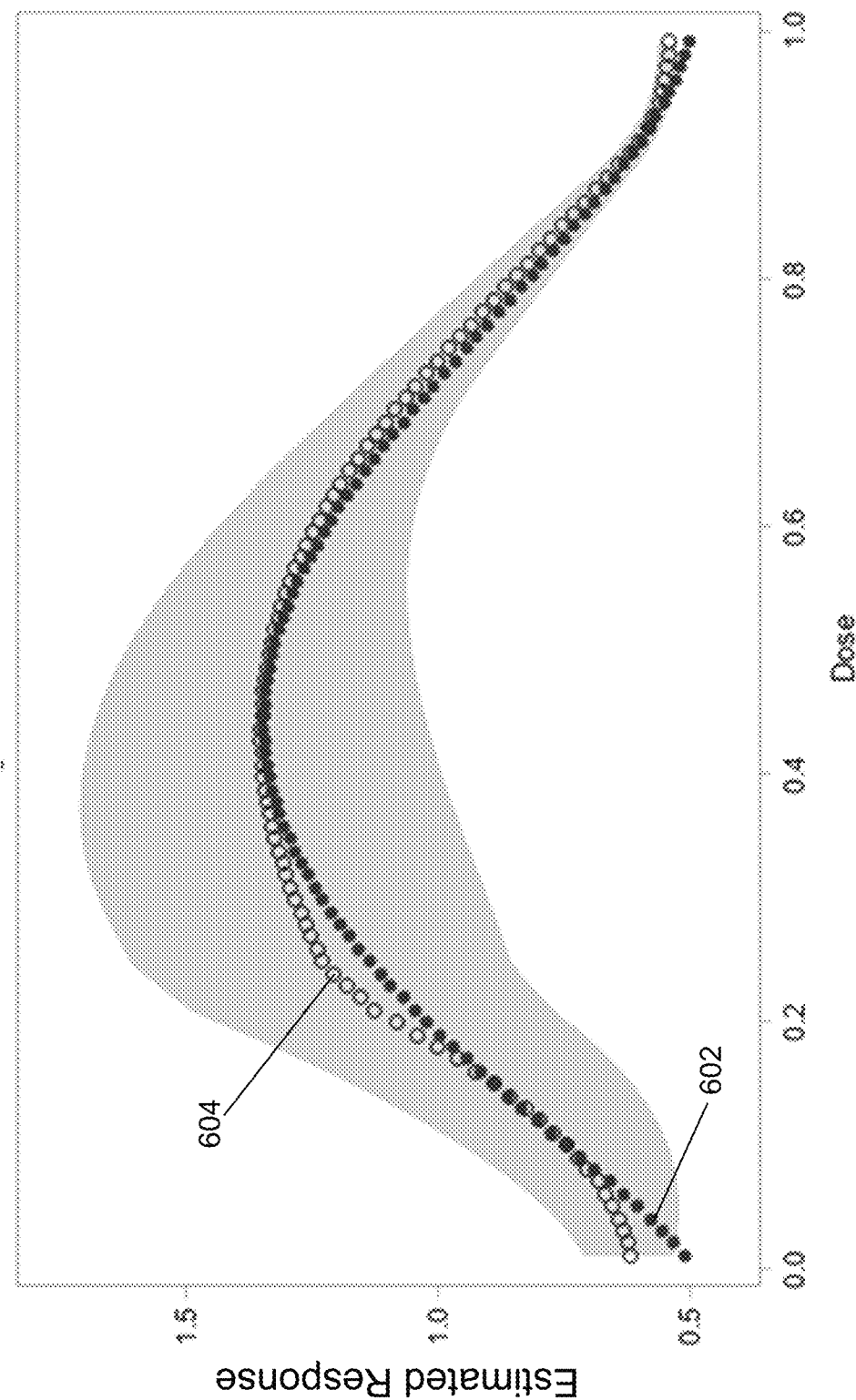
FIG. 6C provides an estimated response for the fourth dataset using the training application of FIG. 2 to compute the standard error in accordance with an illustrative embodiment.

Referring to FIG. 6C, the estimator results for the same randomly selected trial are shown using training application 122 with DNNs selected for both the treatment model and the outcome model and with the estimator function of the statistical parameter being that of the potential outcome. A third response curve 606 shows the estimated response for the selected trial. The confidence interval is in gray for each treatment value (dose). The coverage rate for the 95% CI was 96% meaning that the standard error of the estimator as calculated in operation 226 provided a much better representation of the confidence interval.

A fifth experiment was based on:

$$x_1 = \lfloor 10*u_1 + 1 \rfloor, x_2 = 12u_2, u_1, u_2 \sim U(0,1)$$

$$\eta \sim N(0, 0.01)$$

$$z = 2\left(\frac{50}{3}\left(\frac{(x_2-6)}{12}\right)^4 + \exp\left(-400\left(\frac{(x_2-6)}{12}\right)^2\right) + \frac{x_2}{12} - \frac{41}{20}\right)$$

$$t = \exp(1 + 0.3 z + \eta)$$

$$a = \exp(2 + 0.1 zx_1)$$

$$b = 0.1 zx_1 - 1.5$$

$$y = at^b$$

$$Y(t) = E_X(at^b).$$

Figure 7A:
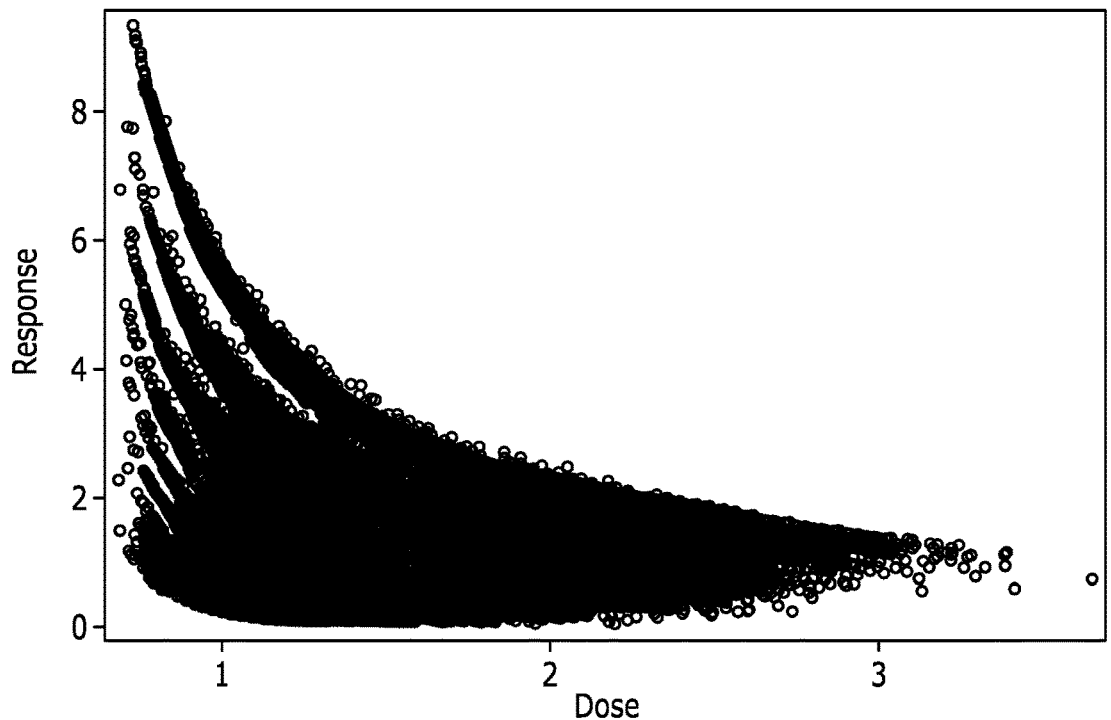
FIG. 7AA provides dose response data for a fifth dataset in accordance with an illustrative embodiment.
Figure 7A:
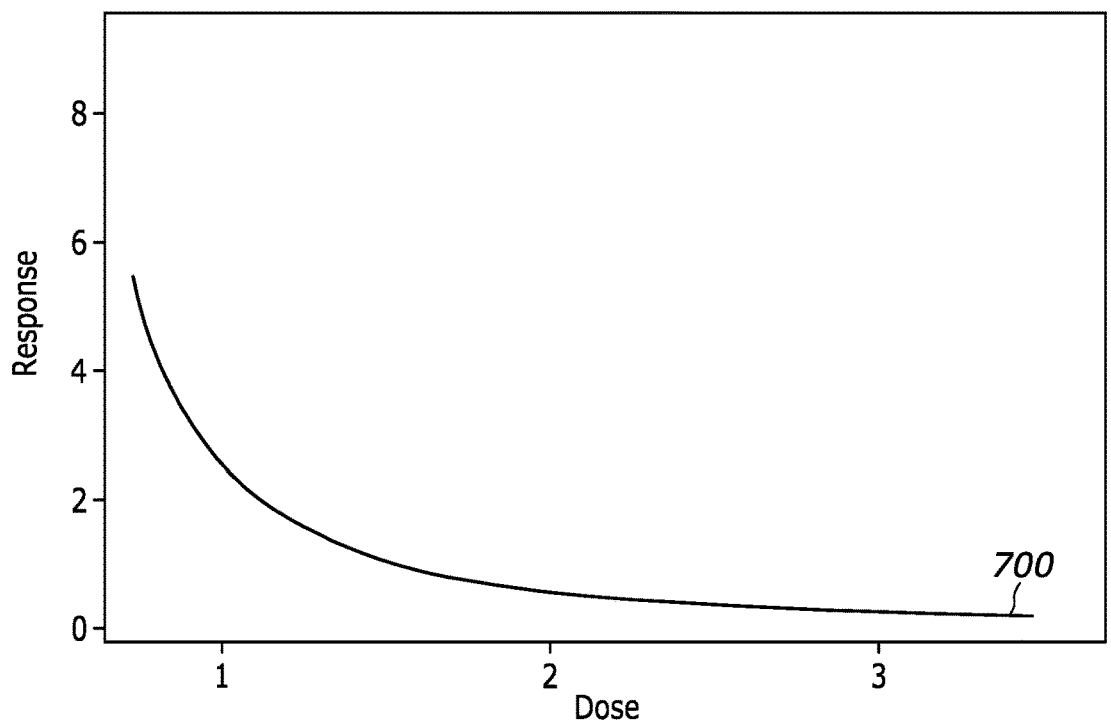

Referring to FIG. 7A, the simulated data is shown for one trial, where the simulated data is shown by the open circles. Referring to FIG. 4AB, true dose-response curve 400 is shown for one trial. Referring to FIG. 7B, the estimator results for a randomly selected trial are shown using the estimator described in the Colangelo paper. A first response curve 702 shows the true response for the selected trial, and a second response curve 704 shows the estimated response for the selected trial. Though not visible a confidence interval is shown. The coverage rate for the 95% CI was 13%.

Figure 7C:
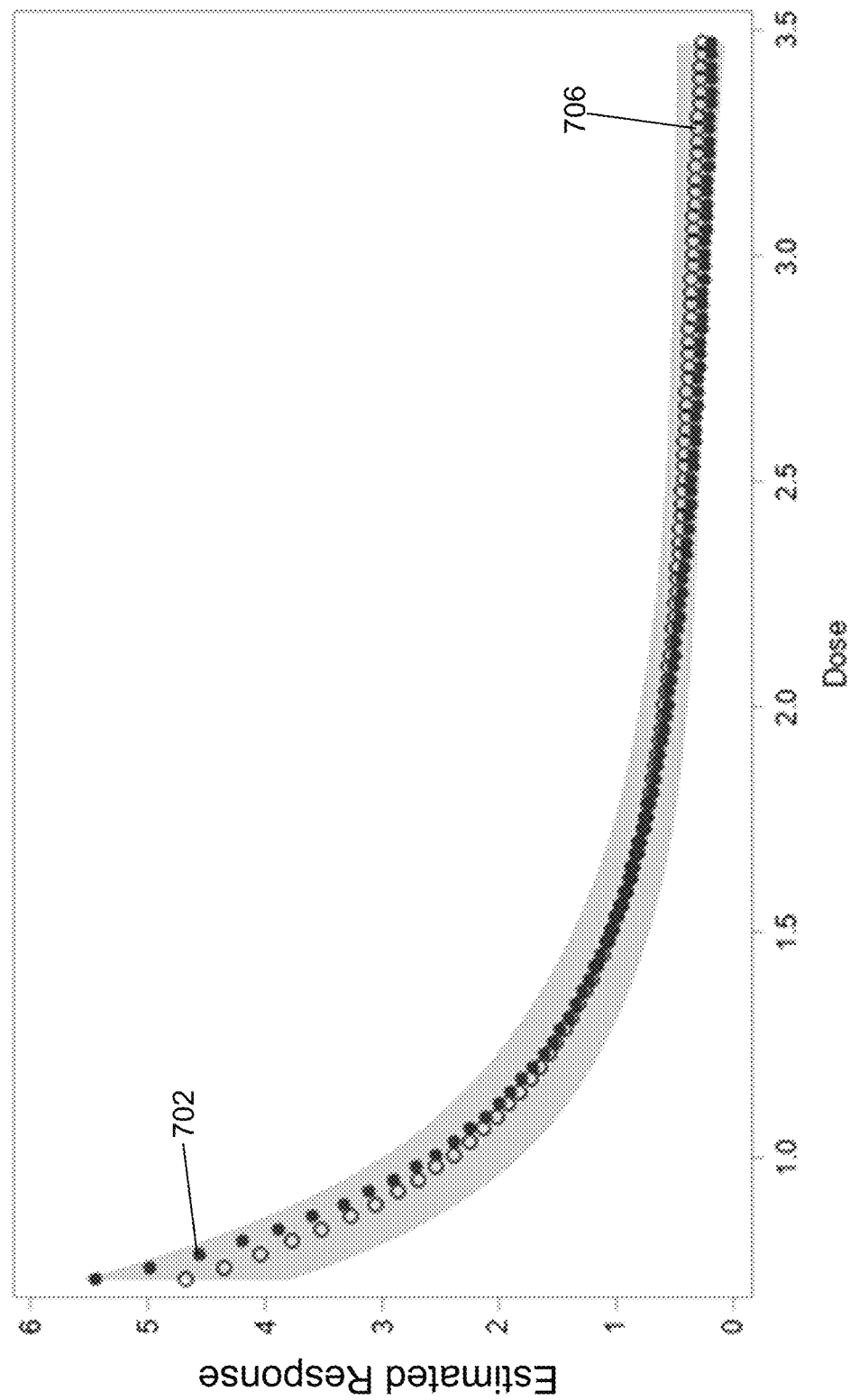
FIG. 7C provides an estimated response for the fifth dataset using the training application of FIG. 2 to compute the standard error in accordance with an illustrative embodiment.

Referring to FIG. 7C, the estimator results for the same randomly selected trial are shown using training application 122 with DNNs selected for both the treatment model and the outcome model and with the estimator function of the statistical parameter being that of the potential outcome. A third response curve 706 shows the estimated response for the selected trial. The confidence interval is in gray for each treatment value (dose). The coverage rate for the 95% CI was 100% meaning that the standard error of the estimator as calculated in operation 226 provided a much better representation of the confidence interval.

Table 1 shows the real coverage rate of the 95% confidence intervals in average across the five experiments and the three different sample sizes using the method described in the Colangelo paper (CL) and using training application 122 (TA 122). The coverage rate was 93% using training application 122 and 22% using the method described in the Colangelo paper meaning the standard error computed in operation 226 and its associated 95% confidence interval is trustworthy while the standard error computed using the method described in the Colangelo paper is not trustworthy.

TABLE 1

| Sample size | $1^{st}$ | $1^{st}$ APE | $2^{nd}$ | $3^{rd}$ | $4^{th}$ | 5th | Average |
|---|---|---|---|---|---|---|---|
| 5,000 CL | 30 | 32 | 46 | 30 | 15 | 22 | 29 |
| 5,000 TA 122 | 94 | 87 | 96 | 84 | 96 | 99.6 | 93 |
| 10,000 CL | 27 | 30 | 41 | 21 | 10 | 16 | 24 |
| 10,000 TA 122 | 96 | 95 | 98 | 82 | 96 | 99 | 94 |
| 50,000 CL | 16 | 21 | 32 | 9 | 4 | 9 | 15 |
| 50,000 TA 122 | 99 | 95 | 93 | 80 | 89 | 97 | 92 |
| Average CL | 24 | 28 | 40 | 20 | 10 | 16 | 23 |
| Average TA 122 | 96 | 92 | 96 | 82 | 91 | 99 | 93 |

Figure 8:
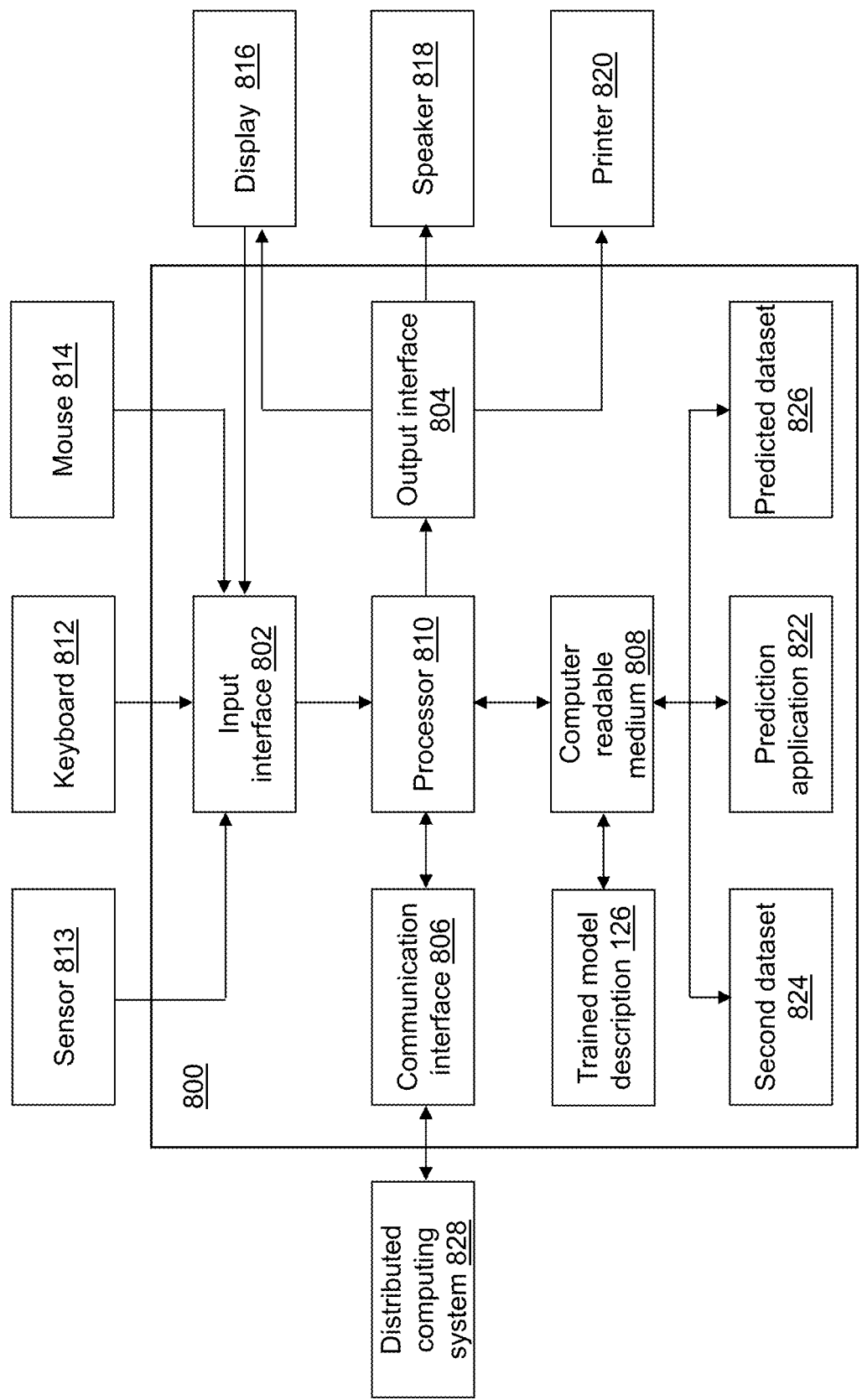
FIG. 8 depicts a block diagram of a prediction device in accordance with an illustrative embodiment.

Referring to FIG. 8, a block diagram of a prediction device 800 is shown in accordance with an illustrative embodiment. Prediction device 800 may include a second input interface 802, a second output interface 804, a second communication interface 806, a second non-transitory computer-readable medium 808, a second processor 810, a prediction application 822, trained model description 126, second dataset 824, and predicted dataset 826. Fewer, different, and/or additional components may be incorporated into prediction device 800. Prediction device 800 and model training device 100 may be the same or different devices.

Second input interface 802 provides the same or similar functionality as that described with reference to input interface 102 of model training device 100 though referring to prediction device 800. Second output interface 804 provides the same or similar functionality as that described with reference to output interface 104 of model training device 100 though referring to prediction device 800. Second communication interface 806 provides the same or similar functionality as that described with reference to communication interface 106 of model training device 100 though referring to prediction device 800. Data and messages may be transferred between prediction device 800 and a distributed computing system 828 using second communication interface 806. Distributed computing system 130 and distributed computing system 828 may be the same or different computing systems. Second computer-readable medium 808 provides the same or similar functionality as that described with reference to computer-readable medium 108 of model training device 100 though referring to prediction device 800. Second processor 810 provides the same or similar functionality as that described with reference to processor 110 of model training device 100 though referring to prediction device 800.

Prediction application 822 performs operations associated with predicting a treatment value and/or an outcome value for each observation vector included in second dataset 824. The predicted value may be stored in predicted dataset 826 to support various data analysis functions as well as provide alert/messaging related to each predicted value. Some or all of the operations described herein may be embodied in prediction application 822. The operations may be implemented using hardware, firmware, software, or any combination of these methods.

Referring to the example embodiment of FIG. 8, prediction application 822 is implemented in software (comprised of computer-readable and/or computer-executable instructions) stored in second computer-readable medium 808 and accessible by second processor 810 for execution of the instructions that embody the operations of prediction application 822. Prediction application 822 may be written using one or more programming languages, assembly languages, scripting languages, etc. Prediction application 822 may be integrated with other analytic tools. As an example, prediction application 822 may be part of an integrated data analytics software application and/or software architecture such as that offered by SAS Institute Inc. of Cary, North Carolina, USA. For example, prediction application 822 may be part of SAS® Enterprise Miner™ developed and provided by SAS Institute Inc. of Cary, North Carolina, USA. Merely for further illustration, prediction application 822 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Econometrics, SAS® Visual Analytics, SAS® Viya™, and SAS In-Memory Statistics for Hadoop®, all of which are developed and provided by SAS Institute Inc. of Cary, North Carolina, USA.

One or more operations of prediction application 822 further may be performed by an ESPE on an event stream instead of reading observation vectors from second dataset 824. Prediction application 822 and training application 122 may be the same or different applications that are integrated in various manners to train the treatment and/or outcome model using input dataset 124 that may be distributed on distributed computing system 130 and to execute the trained treatment and/or outcome model to predict the treatment value or the outcome value for each observation vector included in second dataset 824 that may be distributed on distributed computing system 828.

Prediction application 822 may be implemented as a Web application. Prediction application 822 may be integrated with other system processing tools to automatically process data generated as part of operation of an enterprise, to predict a treatment value or an outcome value, and/or to provide a warning or alert associated with the prediction using second input interface 802, second output interface 804, and/or second communication interface 806 so that appropriate action can be initiated in response. For example, a warning or an alert may be presented using a second display 816, a second speaker 818, a second printer 820, etc. or sent to one or more computer-readable media, display, speaker, printer, etc. of distributed computing system 828.

Input dataset 124 and second dataset 824 may be generated, stored, and accessed using the same or different mechanisms. The treatment variable and the outcome variable are not defined in second dataset 824. Similar to input dataset 124, second dataset 824 may include a plurality of rows and a plurality of columns with the plurality of rows referred to as observations or records, and the columns referred to as variables that are associated with an observation. Second dataset 824 may be transposed.

Similar to input dataset 124, second dataset 824 may be stored on second computer-readable medium 808 or on one or more computer-readable media of distributed computing system 828 and accessed by prediction device 800 using second communication interface 806. Data stored in second dataset 824 may be a sensor measurement or a data communication value, for example, from a sensor 813, may be generated or captured in response to occurrence of an event or a transaction, generated by a device such as in response to an interaction by a user with the device, for example, from a second keyboard 812 or a second mouse 814, etc. The data stored in second dataset 824 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data stored in second dataset 824 may be captured at different time points periodically, intermittently, when an event occurs, etc. One or more columns may include a time value. Similar to input dataset 124, data stored in second dataset 824 may be generated as part of the IoT, and some or all data may be pre- or post-processed by an ESPE.

Similar to input dataset 124, second dataset 824 may be stored in various compressed formats such as a coordinate format, a compressed sparse column format, a compressed sparse row format, etc. Second dataset 824 further may be stored using various structures as known to those skilled in the art including a file system, a relational database, a system of tables, a structured query language database, etc. on prediction device 800 and/or on distributed computing system 828. Prediction device 800 may coordinate access to second dataset 824 that is distributed across a plurality of computing devices that make up distributed computing system 828. For example, second dataset 824 may be stored in a cube distributed across a grid of computers as understood by a person of skill in the art. As another example, second dataset 824 may be stored in a multi-node Hadoop® cluster. As another example, second dataset 824 may be stored in a cloud of computers and accessed using cloud computing technologies, as understood by a person of skill in the art. The SAS® LASR™ Analytic Server and/or SAS® Viya™ may be used as an analytic platform to enable multiple users to concurrently access data stored in second dataset 824.

Referring to FIG. 9, example operations of prediction application 822 are described. Additional, fewer, or different operations may be performed depending on the embodiment of prediction application 822. The order of presentation of the operations of FIG. 9 is not intended to be limiting. Although some of the operational flows are presented in sequence, the various operations may be performed in various repetitions, concurrently (in parallel, for example, using threads and/or distributed computing system 828), and/or in other orders than those that are illustrated.

In an operation 900, a sixth indicator may be received that indicates second dataset 824. For example, the sixth indicator indicates a location and a name of second dataset 824. As an example, the sixth indicator may be received by prediction application 822 after selection from a user interface window or after entry by a user into a user interface window. In an alternative embodiment, second dataset 824 may not be selectable. For example, a most recently created dataset may be used automatically.

In an operation 902, a seventh indicator may be received that indicates trained model description 126. For example, the seventh indicator indicates a location and a name of trained model description 126. As an example, the seventh indicator may be received by prediction application 822 after selection from a user interface window or after entry by a user into a user interface window. In an alternative embodiment, trained model description 126 may not be selectable. For example, most recently created model configuration data may be used automatically. As another example, trained model description 126 may be provided automatically as part of integration with training application 122.

In an operation 904, one or both of the trained treatment model or the trained outcome model description is read from trained model description 126.

In an operation 906, one or both of the trained treatment model or the trained outcome model are instantiated with the model description.

In an operation 908, an observation vector is read from second dataset 824.

In an operation 910, the observation vector is input to the instantiated model.

In an operation 912, a predicted treatment or outcome value for the read observation vector is received as an output of the instantiated model.

In an operation 914, the predicted treatment value may be output, for example, by storing the predicted treatment value with the observation vector to predicted dataset 826. In addition, or in the alternative, the predicted treatment value may be presented on second display 816, printed on second printer 820, sent to another computing device using second communication interface 806, an alarm or other alert signal may be sounded through second speaker 818, etc.

In an operation 916, a determination is made concerning whether or not second dataset 824 includes another observation vector. When second dataset 824 includes another observation vector, processing continues in an operation 918. When second dataset 824 does not include another observation vector, processing continues in an operation 920.

In operation 918, a next observation vector is read from second dataset 824, and processing continues in operation 910.

In operation 920, processing stops and cleanup is performed as needed.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:
   train a treatment model to optimize a treatment loss function based on a treatment variable using a plurality of observation vectors;
   execute the treatment model to compute an estimated treatment variable value for each observation vector of the plurality of observation vectors, wherein each observation vector includes covariate variable values for a plurality of covariate variables, a treatment variable value for a treatment variable, and an outcome variable value for an outcome variable;
   compute a weight value for each observation vector of the plurality of observation vectors using a respective computed estimated treatment variable value;
   train an outcome model to optimize an outcome loss function based on the treatment variable value and the outcome variable value of the plurality of observation vectors, wherein the outcome loss function includes the computed weight value for each observation vector of the plurality of observation vectors;
   execute the outcome model to compute an estimated outcome value for each observation vector of the plurality of observation vectors using the treatment variable value for each observation vector of the plurality of observation vectors;
   compute a standard error value associated with the outcome model using a first variance value computed using the treatment variable value of the plurality of observation vectors, using a second variance value computed using the treatment variable value and the estimated treatment variable value of the plurality of observation vectors, and using a third variance value computed using the estimated outcome value of the plurality of observation vectors; and
   output the computed standard error value.

2. The non-transitory computer-readable medium of claim 1, wherein the computer-readable instructions further cause the computing device to:
   compute a selection bias value using the first variance value computed using the treatment variable value of the plurality of observation vectors and using the second variance value computed using the treatment variable value and the estimated treatment variable value of the plurality of observation vectors.

3. The non-transitory computer-readable medium of claim 1, wherein the computer-readable instructions further cause the computing device to:
   read an observation vector from a dataset;
   execute the trained treatment model with the read observation vector to predict a treatment value for the read observation vector; and
   output the predicted treatment value for the read observation vector.

4. The non-transitory computer-readable medium of claim 1, wherein the treatment model is a neural network that includes a plurality of connected neural network layers.

5. The non-transitory computer-readable medium of claim 4, wherein the treatment model is trained to regress the treatment variable values of the plurality of observation vectors on a set of covariate variable values selected from the plurality of covariate variables.

6. The non-transitory computer-readable medium of claim 1, wherein the computer-readable instructions further cause the computing device to:
   output the computed standard error value to a display.

7. The non-transitory computer-readable medium of claim 1, wherein the computer-readable instructions further cause the computing device to:
read an observation vector from a dataset;
execute the trained outcome model with the read observation vector to predict an outcome value for the read observation vector; and
output the predicted outcome value for the read observation vector.

8. The non-transitory computer-readable medium of claim 1, wherein the outcome model is a neural network that includes a plurality of connected neural network layers.

9. The non-transitory computer-readable medium of claim 8, wherein the outcome model is trained to regress the outcome variable values of the plurality of observation vectors on a set of covariate variable values selected from the plurality of covariate variables and the treatment variable values of the plurality of observation vectors.

10. The non-transitory computer-readable medium of claim 1, wherein the weight value is further computed using a respective treatment variable value.

11. The non-transitory computer-readable medium of claim 10, wherein the weight value is computed using $$w = \exp\frac{(t_i - \hat{t}_i)^2}{v},$$

where $w$ indicates the weight value, $t_i$ indicates the treatment variable value of an $i^{th}$ observation vector of the plurality of observation vectors, $\hat{t}_i$ indicates the computed estimated treatment variable value of the $i^{th}$ observation vector of the plurality of observation vectors, and $v$ indicates a variance of the computed estimated treatment variable value of the plurality of observation vectors.

12. The non-transitory computer-readable medium of claim 11, wherein the first variance value is computed using $$v_1 = \frac{1}{N}\sum_{i=1}^{N}(t_i - \bar{t})^2,$$

where $v_1$ indicates the first variance value, $N$ indicates a number of the plurality of observation vectors, $\bar{t}$ indicates an average treatment variable value of the plurality of observation vectors, and $t_i$ indicates a treatment variable value of an $i^{th}$ observation vector of the plurality of observation vectors.

13. The non-transitory computer-readable medium of claim 12, wherein $$\bar{t} = \frac{1}{N}\sum_{i=1}^{N}t_i.$$

14. The non-transitory computer-readable medium of claim 12, wherein the second variance value is computed using $$v_2 = \frac{1}{N}\sum_{i=1}^{N}(\hat{t}_i - t_i)^2,$$

where $v_2$ indicates the second variance value, and $\hat{t}_i$ indicates an estimated treatment variable value of the $i^{th}$ observation vector of the plurality of observation vectors.

15. The non-transitory computer-readable medium of claim 14, wherein the standard error value is further computed using a selection bias value computed using $$S_b = \frac{v_1}{v_2},$$

where $S_b$ indicates the selection bias value.

16. The non-transitory computer-readable medium of claim 15, wherein the standard error value is further computed using a standard error parameter value computed using $$SEP = \left(\frac{N}{S_b}\right)^{0.2},$$

where SEP indicates the standard error parameter value.

17. The non-transitory computer-readable medium of claim 16, wherein the standard error value is further computed as a quotient of the third variance value and the computed standard error parameter value.

18. The non-transitory computer-readable medium of claim 16, wherein the standard error value is an error computed for the estimated outcome value.

19. The non-transitory computer-readable medium of claim 18, wherein the third variance value is computed using $$v_3 = \frac{1}{N}\sum_{i=1}^{N}(\hat{y}_i - \bar{y}_i)^2,$$

where $v_3$ indicates the third variance value, $\bar{y}_i$ indicates an average outcome variable value of the plurality of observation vectors, and $\hat{y}_i$ indicates the estimated outcome value of the $i^{th}$ observation vector of the plurality of observation vectors.

20. The non-transitory computer-readable medium of claim 19, wherein $$\bar{y}_i = \frac{1}{N}\sum_{i=1}^{N}\hat{y}_i.$$

21. The non-transitory computer-readable medium of claim 19, wherein the standard error value associated with the outcome model is computed using $$SE = \frac{\sqrt{v_3}}{SEP},$$

where SE indicates the standard error value.

22. The non-transitory computer-readable medium of claim 16, wherein the standard error value is an error computed for an average partial effects (APE) value.

23. The non-transitory computer-readable medium of claim 22, wherein $$\hat{r}_i = \frac{\hat{y}_{i,+} - \hat{y}_{i,-}}{2\varepsilon}, i = 1, \ldots, N,$$

where $\varepsilon$ indicates a predefined error value, $\hat{y}_{i,+}$ indicates a first estimated outcome value of the $i^{th}$ observation vector of the plurality of observation vectors computed by executing the trained outcome model with a set of covariate variable values selected from the plurality of covariate variables and a first adjusted treatment variable value of the $i^{th}$ observation vector, where the first adjusted treatment variable value is t+$\varepsilon$, $\hat{y}_{i,-}$ indicates a second estimated outcome value of the $i^{th}$ observation vector of the plurality of observation vectors computed by executing the trained outcome model with the set of covariate variable values selected from the plurality of covariate variables and a second adjusted treatment variable value of the $i^{th}$ observation vector, where the second adjusted treatment variable value is t−$\varepsilon$, and t indicates a predefined treatment variable value.

24. The non-transitory computer-readable medium of claim 23, wherein the standard error value associated with the outcome model is computed using $$SE = \left(\frac{v_3}{2*SEP^2}\right)^{1/3},$$

where SE indicates the standard error value.

25. The non-transitory computer-readable medium of claim 1, wherein a type of machine learning model of the outcome model is selected from the group consisting of a decision tree model type, a gradient boosting tree model type, a forest model type, a neural network model type, a k-means clustering model type, a factorization machine model type, a support vector machine model type, and a logistic regression model type.

26. A computing device comprising:
a processor; and
a computer-readable medium operably coupled to the processor, the computer-readable medium having computer-readable instructions stored thereon that, when executed by the processor, cause the computing device to
train a treatment model to optimize a treatment loss function based on a treatment variable using a plurality of observation vectors;
execute the treatment model to compute an estimated treatment variable value for each observation vector of the plurality of observation vectors, wherein each observation vector includes covariate variable values for a plurality of covariate variables, a treatment variable value for a treatment variable, and an outcome variable value for an outcome variable;
compute a weight value for each observation vector of the plurality of observation vectors using a respective computed estimated treatment variable value;
train an outcome model to optimize an outcome loss function based on the treatment variable value and the outcome variable value of the plurality of observation vectors, wherein the outcome loss function includes the computed weight value for each observation vector of the plurality of observation vectors;
execute the outcome model to compute an estimated outcome value for each observation vector of the plurality of observation vectors using the treatment variable value for each observation vector of the plurality of observation vectors;
compute a standard error value associated with the outcome model using a first variance value computed using the treatment variable value of the plurality of observation vectors, using a second variance value computed using the treatment variable value and the estimated treatment variable value of the plurality of observation vectors, and using a third variance value computed using the estimated outcome value of the plurality of observation vectors; and
output the computed standard error value.

27. The computing device of claim 26, wherein the computer-readable instructions further cause the computing device to:
read an observation vector from a dataset;
execute the trained treatment model with the read observation vector to predict a treatment value for the read observation vector; and
output the predicted treatment value for the read observation vector.

28. A method of computing a standard error of an estimator determined by training a machine learning model, the method comprising:
training, by a computing device, a treatment model to optimize a treatment loss function based on a treatment variable using a plurality of observation vectors;
executing, by the computing device, the treatment model to compute an estimated treatment variable value for each observation vector of the plurality of observation vectors, wherein each observation vector includes covariate variable values for a plurality of covariate variables, a treatment variable value for a treatment variable, and an outcome variable value for an outcome variable;
computing, by the computing device, a weight value for each observation vector of the plurality of observation vectors using a respective computed estimated treatment variable value;
training, by the computing device, an outcome model to optimize an outcome loss function based on the treatment variable value and the outcome variable value of the plurality of observation vectors, wherein the outcome loss function includes the computed weight value for each observation vector of the plurality of observation vectors;
executing, by the computing device, the outcome model to compute an estimated outcome value for each observation vector of the plurality of observation vectors using the treatment variable value for each observation vector of the plurality of observation vectors;
computing, by the computing device, a standard error value associated with the outcome model using a first variance value computed using the treatment variable value of the plurality of observation vectors, using a second variance value computed using the treatment variable value and the estimated treatment variable value of the plurality of observation vectors, and using a third variance value computed using the estimated outcome value of the plurality of observation vectors; and
outputting, by the computing device, the computed standard error value.

29. The method of claim 28, further comprising:
reading, by the computing device, an observation vector from a dataset;
executing, by the computing device, the trained treatment model with the read observation vector to predict a treatment value for the read observation vector; and
outputting, by the computing device, the predicted treatment value for the read observation vector.

30. The method of claim 28, wherein the weight value is further computed using a respective treatment variable value.

* * * * *

UNITED STATES PATENT AND TRADEMARK OFFICE
CERTIFICATE OF CORRECTION

| | |
|---|---|
| PATENT NO. | : 12,165,031 B2 |
| APPLICATION NO. | : 18/529014 |
| DATED | : December 10, 2024 |
| INVENTOR(S) | : Sylvie Tchumtchoua Kabisa et al. |

Page 1 of 1

It is certified that error appears in the above-identified patent and that said Letters Patent is hereby corrected as shown below:

In the Claims

Claim 12, Column 23, Line 47:
Delete the phrase "t indicates" and replace with --$\bar{t}$ indicates--.

Signed and Sealed this
Sixth Day of May, 2025

Coke Morgan Stewart
*Acting Director of the United States Patent and Trademark Office*